(12) United States Patent
Saylor et al.

(10) Patent No.: US 7,016,480 B1
(45) Date of Patent: Mar. 21, 2006

(54) SYSTEM AND METHOD FOR GRANTING PERMISSION TO RECEIVE INTERACTIVE VOICE BROADCAST OF A VOICE SERVICE

(75) Inventors: Michael J. Saylor, Vienna, VA (US); Frederick Richards, III, Washington, DC (US); Steven S Trundle, Falls Church, VA (US); Mark J. Rolincik, Fairfax, VA (US); Douglas F. Gardner, Rockville, MD (US)

(73) Assignee: MicroStrategy, Inc., McLean, VA (US)

( * ) Notice: Subject to any disclaimer, the term of this patent is extended or adjusted under 35 U.S.C. 154(b) by 569 days.

(21) Appl. No.: 10/062,473

(22) Filed: Feb. 5, 2002

Related U.S. Application Data

(60) Provisional application No. 60/153,222, filed on Sep. 13, 1999.

(51) Int. Cl.
*H04M 1/64* (2006.01)

(52) U.S. Cl. ............... 379/67.1; 379/88.01; 379/88.02; 379/88.03; 379/88.04; 379/88.13; 379/88.17; 379/88.18; 379/88.19

(58) Field of Classification Search ............... 379/67.1, 379/88.01, 88.02, 88.03, 88.04, 88.13, 88.16, 379/88.19, 88.18, 88.17; 345/329, 331, 333
See application file for complete search history.

(56) References Cited

U.S. PATENT DOCUMENTS

| | | | |
|---|---|---|---|
| 4,059,732 A | 11/1977 | Hayden et al. |
| 4,355,207 A | 10/1982 | Curtin |
| 4,742,516 A | 5/1988 | Yamaguchi |
| 4,761,807 A | 8/1988 | Matthews et al. |
| 4,932,021 A | 6/1990 | Moody |
| 5,134,647 A | 7/1992 | Pugh et al. |
| 5,216,603 A | 6/1993 | Flores et al. |
| 5,243,643 A | 9/1993 | Sattar et al. |
| 5,251,251 A | 10/1993 | Barber et al. |
| 5,283,731 A | 2/1994 | Lalonde et al. |
| 5,687,220 A | 11/1997 | Finnigan |
| 5,825,856 A | 10/1998 | Porter et al. |
| 5,828,732 A | 10/1998 | Gow |

(Continued)

OTHER PUBLICATIONS

Lisa Ammerman, Voice Portals Promise a Hands-Free Internet Future, Feb. 2001.

(Continued)

*Primary Examiner*—Allan Hoosain
(74) *Attorney, Agent, or Firm*—Hunton & Williams LLP

(57) ABSTRACT

A system and method granting permission to transmit interactive voice broadcasts of a voice service over a voice network, including information derived from on-line analytical processing (OLAP) systems is disclosed. The system and method include a call server and a method for generating interactive voice pages related to product and service offerings, and for transmitting the voice pages to a user based on the user's permission. A permission module is provided for receiving user permission information from the user indicating the user's permission for telephone-based marketing.

20 Claims, 22 Drawing Sheets

U.S. PATENT DOCUMENTS

| | | |
|---|---|---|
| 5,838,906 A | 11/1998 | Doyle et al. |
| 5,884,262 A | 3/1999 | Wise et al. |
| 5,901,214 A | 5/1999 | Shaffer et al. |
| 5,915,001 A | 6/1999 | Uppaluru |
| 5,923,736 A | 7/1999 | Shachar |
| 5,924,070 A | 7/1999 | Ittycheriah et al. |
| 5,926,526 A | 7/1999 | Rapaport et al. |
| 5,937,390 A | 8/1999 | Hyodo |
| 5,945,989 A * | 8/1999 | Freishtat et al. ............ 715/760 |
| 5,963,626 A * | 10/1999 | Nabkel .................. 379/142.01 |
| 6,081,782 A | 6/2000 | Rabin |
| 6,501,832 B1 * | 12/2002 | Saylor et al. ............ 379/88.04 |
| 6,539,359 B1 * | 3/2003 | Ladd et al. .................. 704/275 |
| 6,768,788 B1 * | 7/2004 | Langseth et al. .......... 379/67.1 |

OTHER PUBLICATIONS

Wireless Week, Brad Smith, "Need An Answer? Just Ask", Jun. 26, 2000, pp. 1-2, <http://www.wirelessweek.com/news/june00/sev626.htm>.

* cited by examiner

SYSTEM AND METHOD FOR GRANTING PERMISSION TO RECEIVE INTERACTIVE VOICE BROADCAST OF A VOICE SERVICE

RELATED APPLICATION DATA

This patent application is related to U.S. patent application Ser. No. 09/661,375, filed Jan. 11, 2000, which claims priority to U.S. Patent Application No. 60/153,222, filed Sep. 13, 1999. This application is also related to co-pending U.S. Patent applications entitled, "System and Method for Personalizing an Interactive Voice Broadcast of a Voice Service Based on Automatic Number Identification", Ser. No. 10/062,472; "System And Method For Personalizing An Interactive Voice Broadcast Of A Voice Service Based on Particulars of a Request", Ser. No. 10/062,474; and "System And Method For System And Method For Personalizing An Interactive Voice Broadcast Of A Voice Service Based on Particulars of a Request", Ser. No. 10/062,513.

FIELD OF THE INVENTION

This invention relates to a system and method for granting permission to initiate an interactive voice session to the user of a voice service over a voice network, including information in the voice service based on line analytical processing (OLAP) systems, where content stored in a database can be readily obtained by a requester on the fly and in a personalized, interactive manner.

BACKGROUND OF THE INVENTION

Information is unquestionably one of the most valuable commodities of modern day society. The ability to obtain and provide information quickly and efficiently is essential to the success of any commercial enterprise or venture. Businesses, for example, have a need to provide their customers with comprehensive information on its products and services. The importance of information is so vital that much of the focus of developing technology is centered on making information available in as instantaneous and reliable a manner as possible.

One source of instantaneous information is the standard, everyday telephone. Interactive telephone systems, for example, enable a user to interactively request information through a computerized interface. These systems typically utilize predefined or prerecorded menus that a user accesses by calling in to a central number. The predefined menus typically enable a user to request information by stepping through various predefined choices that remain the same regardless of who the caller is or of the content of the information being accessed. Such information may include accessing account information, movie times, service requests, etc.

Another popular source of information is the Internet. The advent of the Internet has enabled users to access a wide amount of information. Internet users are able to "browse" through millions of websites located on the world wide web to obtain desired information. Users of the Internet are able to designate the Uniform Resource Identifier (or URL) of a desired website, and are thereafter able to navigate through the menus and functions offered by the website as a means to obtain information or services.

A problem with these systems is that the menu structure is typically set and not customized to a particular user's preferences or customized to the information available to that user. Therefore, a user may have to wade through a host of inapplicable options to get to the one or two options applicable to that user. Further, a user may be interested in particular information. With existing telephone call-in systems as well as most websites, that user has to input the same series of options or cycle through the same web pages or menus each time they want to hear or access that information. If the user desires to hear the information frequently, the telephone input system described is a very time consuming and wasteful method of accessing that information. Moreover, if a user is interested only in knowing if a particular value or set of values has changed over a predetermined period of time, in such a system, the user is required to initiate a call and wade through all of the information to determine if the particular value has changed.

These and other drawbacks exist with current systems.

SUMMARY OF THE INVENTION

An object of the invention is to overcome these and other drawbacks in existing systems.

Accordingly, the present invention provides a system and method that provides customized and personalized interactive voice sessions based on data contained by a voice output delivery system. In one embodiment, the system generates and transmits to the user telephone-based marketing that comprise interactive voice pages related to product and service offerings. For example, a voice output system may contact a user and present the user with updated sports information by phone, such a voice-based output system may be connected to a data storage system that contains the sports information of interest to the user. The system may contact the user by calling a specified telephone number associated with the user, for example.

Once the system establishes communication, the voice delivery system may determine information about the user, call, or request to personalize or customize options, output, or access to information available through the system during that session. For example, if the system contacts a user in the Washington D.C. area and provides that user with a voice service relating to sports, then the system may determine to limit the provided information to that relating to professional teams from the Washington D.C. area. The number called by the system may effect a personalization of output accordingly. For example, the system may determine personalization based on the area code and number of the user being called.

Prior to generating and transmitting voice services to users, however, permission must be granted by the user to the system to provide the telephone-based marketing services. This may be performed by a permission module that receives user permission information from a user indicating the user's permission for telephone-based marketing. The system may also include a call server that generates the voice services related to product and service offerings, and that transmits the services to the user based on the user's permission.

By obtaining the user's permission, the system narrows the information used to provide exactly the information the user grants permission to receive. For example, if a user is unavailable or not interested in receiving telephone-based marketing on Fridays and Saturdays, the system may remove the users name and telephone from the queue of outgoing calls on those days. Similarly, the user may decide to receive stock and financial information at his or her work telephone number and sports information at his or her home number. The system may then arrange its outgoing calls accordingly. Another form of permission may relate to the time when the services are sent such as, for example, morning or afternoon, night or day, weekday or weekend, etc. The specific time in a day may also be a limitation.

Other features and advantages of the present invention will be apparent to one of ordinary skill in the art upon reviewing the detailed description of the present invention.

DETAILED DESCRIPTION OF THE PREFERRED EMBODIMENTS

Figure 1A:
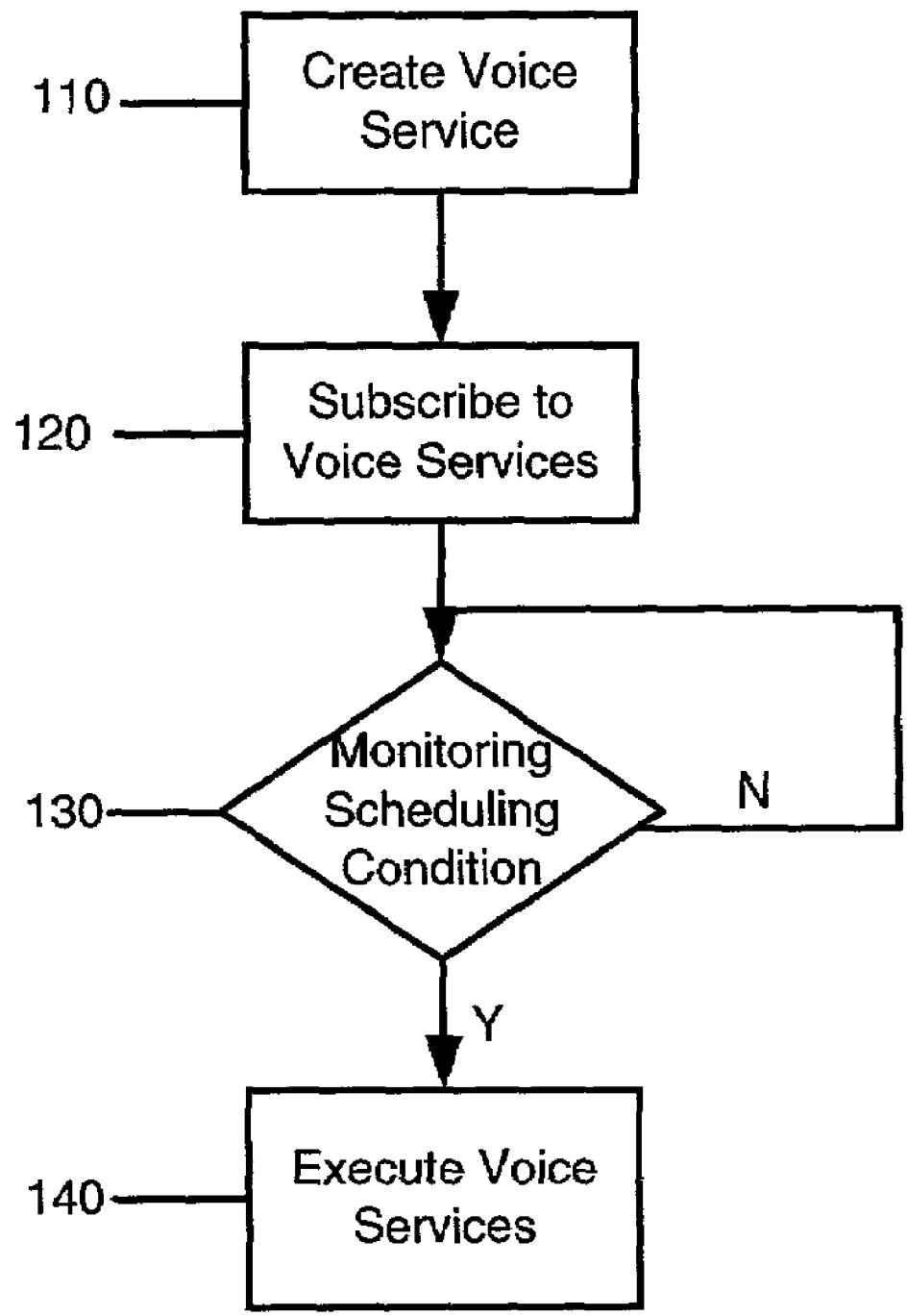
FIG. 1a is a flow chart of a method in accordance with an embodiment of the present invention.

The markup-language-driven interactive voice broadcast ("IVB") embodiments discussed herein may be used in connection with systems and methods that enable communication to a user of content and speech generation in response to a user's request. According to one embodiment, the system and method of the invention provides the ability to receive telephone calls from callers requesting voice services. Further, the invention also permits a caller to sort though or browse various voice services during an IVB. The system and method of the invention deploys an IVB using XML-based documents that permit interaction between the system and users.

The method and system of the present invention enables hosting of numerous voice services (or applications) that can be accessed by callers to obtain information stored in databases. According to one embodiment, a system is provided that may receive inbound call requests for particular voice services. In one embodiment, the system and method of the invention provides on the fly generation of voice menus that are used to drive an IVB. According to one embodiment, the voice menus are generated from a unique markup language created to facilitate interactive voice broadcasting. According to one embodiment, the markup language used is TML. Other XML-based markups, such as VoiceXML™ could be used.

To facilitate understanding of the system and method of the present invention, a brief explanation of TML is provided. TML is a markup language that enables interactive voice broadcasting. According to one embodiment, TML is based on XML and comprises a set of elements that are used to define functions for various portions of a document and a set of tags that correspond to the elements. The tags are used to delimit portions of a document that belong to a particular element.

According to one embodiment, TML comprises a Header Element, a Container Element, a Dialog Element, a Text Element, a For-Each Element, an Input Element, an Option Element, a Prompt Element, an Error Element, and a System-Error Element.

A Header Element is used to identify the markup language on which a document is based.

A Container Element is used to identify a document as a TML document.

A Dialog Element is the basic unit of interaction between a system and a user. According to one embodiment, a Dialog Element may contain text that is to be spoken to a user. A Dialog Element may contain Text Elements, For-Each Elements, Input Elements, Option Elements and Prompt Elements.

A Text Element may also be called a Speech Element and defines text portions of a document. According to one embodiment, text portions of a document are used to specify information that is to be spoken to a user.

A For-Each Element is used to cycle (loop) through a group of related variables. to dynamically generate speech from data.

An Input Element defines sections of Dialog Elements that contain interactive portions of the TML document. According to one embodiment, an Input Element contains elements that pertain to a response expected from a user.

An Option Element identifies a predefined user selection that is associated with a particular input. According to one embodiment, Option Elements are used to associate one or more choices available to a user with telephone keys.

A Prompt Element defines a particular input that is expected. According to one embodiment, a Prompt Element defines that a sequence or number of key presses from a telephone keypad is expected as input. Unlike an Option Element, a Prompt Element is not associated with predefined user selections.

An Error Element defines a response to invalid input by a user. For example, an Error Element may be used to define the response to entry of an undefined option.

A System-Error Element defines a response to predetermined system events. For example, a System-Error Element may be used to define the response to expiration of the waiting time for a user input.

Within any given document, TML uses a set of corresponding tags to delimit each of the above defined elements.

According to another embodiment, a TML document is a collection of the above described elements. Within a document, the boundaries of an element are delimited by its corresponding tags. Moreover, according to one embodiment, elements are arranged as parent elements and child elements. Parent elements may contain text and other elements. If an element is contained by another element, it may be called a child of the containing element.

According to another embodiment, a TML document is used to provide interactive, dynamic voice services to a user through a telephone or other voice-enabled terminal device. A TML document enables a user to receive dynamically generated information and provide various types of input in response. According to one embodiment, the TML elements and tags described above are used to specify text that is to be communicated to a user and to request input from a user. According to this embodiment, the specified text is passed through a text-to-speech converter and conveyed to a user over a telephone.

According to one embodiment, Dialog elements identify the portions of the TML document that communicate with a user. Within a Dialog element, Text Elements and For-Each Elements define text that is to be read to a user. Input Elements identify the portion of a Dialog Element that are interactive with a user. Within an Input Element, Option Elements and Prompt Elements may define text to be read to a user, but they also request input from a user. According to one embodiment, one or more Option Elements may include text that requests that a user choose one or more items from a list of choices defined by the Option Elements using the telephone keypad or by speaking a response. According to another embodiment, a Prompt Element may include text that requests free-form input from a user, e.g., by entering alpha-numeric characters using the telephone keypad or speaking a response.

With respect to the use of spoken responses, according to one embodiment, speech recognition technology is used to enable a user to respond to a prompt element or to select an option element verbally by saying a number, e.g., "one.". The verbal response is recognized and used just as a keypress would be used. According to another embodiment, the user may provide a free form verbal input. For example, a prompt element may request that a user enter, e.g., the name of a business. In response the user speaks the name of a business. That spoken name is then resolved against predetermined standards to arrive at the input. Word spotting and slot filling may also be used in conjunction with such a prompt to determine the user input. For example, a prompt may request that the user speak a date and time, e.g., to choose an airline flight or to make a restaurant reservation. The user's spoken response may be resolved against known date and time formats to determine the input. According to another embodiment, a prompt is used to request input using natural language. For instance, in conjunction with a voice service to be used to make travel plans, instead of having separate prompt elements request input for flight arrival, departure dates and locations, a single natural language prompt may ask, "Please state your travel plan." In response, the user states 'I'd like to go from Washington D.C. to New York city on the $3^{rd}$ of January and return on the $3^{rd}$ of February'. This request would be processed using speech recognition and pattern matching technology to derive the user's input.

The TML document may comprise Error element and System-Error Elements. According to one embodiment, an Error element includes text that notifies a user of an invalid input. The System-Error element may also include text that notifies a user that the system has experienced an undefined event, e.g., a non-response to an Input Element.

The TML-driven interactive voice broadcast embodiments discussed above may be used in connection with systems and methods that enable communication to a user of content and speech generation in response to a user's request. Specifically, the system and method of the invention contemplate the ability to receive telephone calls from users requesting voice services. The invention also contemplates the user being able to sort though or browse various voice services during an IVB. The essence of the system and method of the invention is the deployment of an IVB using XML-based documents to permit interaction between the system and users.

One aspect of the present invention relates to a system and method for granting permission to a voice service provider to selectively transmit interactive voice broadcasts of a voice service on the fly and in a personalized and dynamic manner. As is shown below in FIGS. 1–6, the invention contemplates the ability to broadcast interactive voice broadcasts corresponding to particular voice services. These voice services are broadcast according to a predetermined schedule or on the occurrence of a predetermined triggering event. In all cases, however, the recipient of the voice service must have previously authorized transmission of the voice service before the provider may lawfully broadcast the service.

Figure 1B:
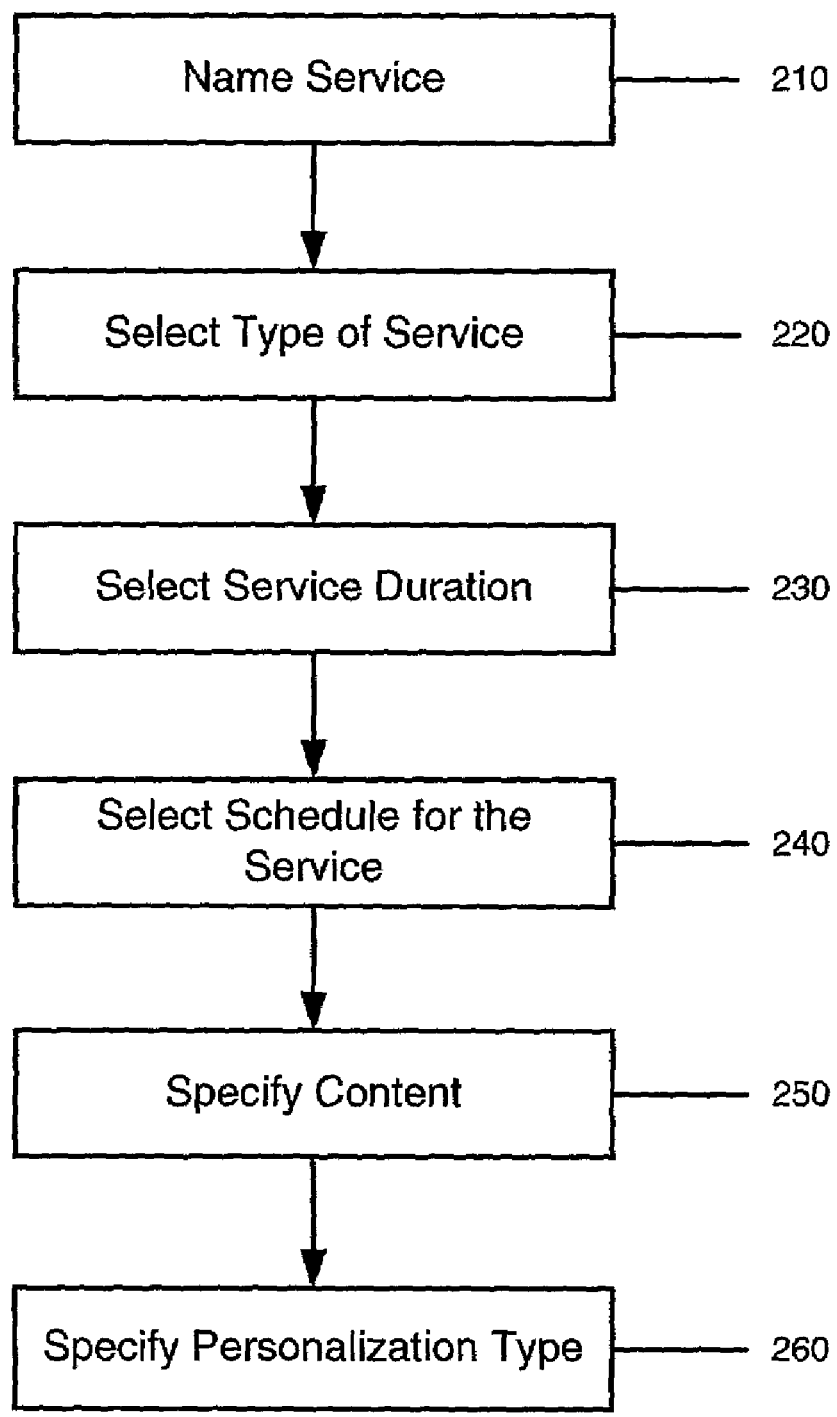
FIG. 1b is a flow chart indicating a method of generating a voice service according to one embodiment of the present invention.
Figure 15:
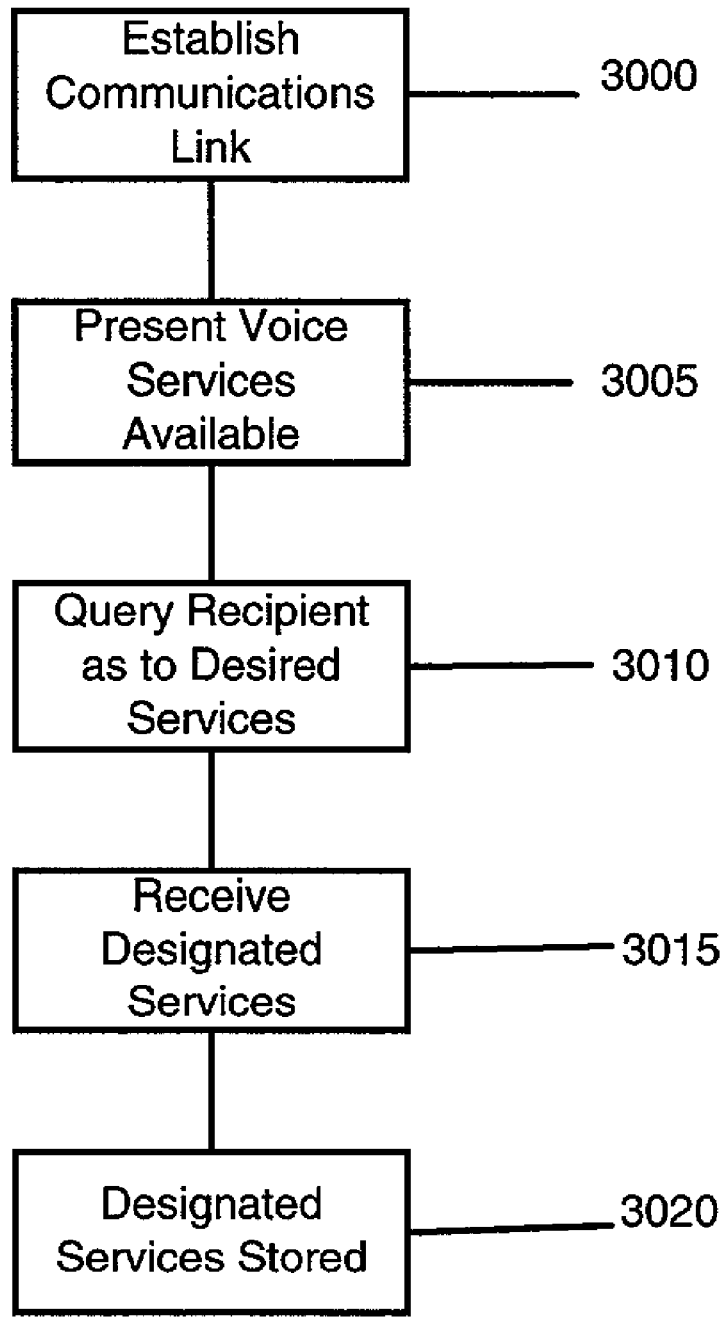
FIG. 15 is a schematic flow chart of a method of granting permission to generate and transmit telephone-based marketing.

FIG. 15 demonstrates the flow process of a method for granting permission to the voice service provider to broadcast an interactive voice broadcast. At step 3000, a communication link with the intended recipient of a voice service may be established. In one embodiment, the link may be established via the Internet. In another embodiment, the link may be established via a voice network, such as the Public Switch Telephone Network ("PSTN"). According to one embodiment, the communication link may be established during the recipient's subscription to the voice service or during generation of a voice service, as shown in FIGS. 1a and 1b. In another embodiment, the communication link is established at any time prior to the broadcasting of a voice service to the recipient.

After the communications link with the recipient is established, at step 3005 the recipient may be presented with a list of voice services available for broadcast. A description of each service may also be provided, such as the nature of the information broadcast and the expected frequency of broadcast. Other information related to each particular voice service may also be presented. In another embodiment, the user may designate the desired voice pages without being provided a description of the services. At step 3010, the recipient may be queried as to which voice service(s) he or she would like to receive. At step 3015, the recipient indicates those voice service(s), as well as other information relevant to the broadcasting of the voice service. For example, the recipient may indicate a specific time during which he or she is not to be interrupted with a voice service broadcast; times when voice service broadcasts are welcome; and the phone numbers that are to be dialed. Other parameters may be selected. In one embodiment, the recipient may indicate specific phone numbers that should be called during particular times of the day, such as the office number during business hours, the cell phone on weekends, and the house phone at night. In one embodiment, the recipient may respond by inputting or speaking digits, characters, or words that correspond to specific services. In one such embodiment, the recipient may speak the names of the desired services. In yet another embodiment, the recipient may send electronic mail correspondence indicating the desired services. At step 3020, the voice services identified by the recipient are saved and stored for future retrieval and access.

The above process may be controlled by a permission module programmed to interact with the recipient. Permission module may be stored within call server 18 (FIG. 3*a*) and may be programmed to perform the series of steps shown in FIG. 15. Permission module may also be located in a permission server (not shown) connected to voice service server 16 of FIG. 3*a*. In either case, the permission module communicates with voice service system 16 and subscription interface 20 and passes all information obtained from a recipient during the process of FIG. 15. In one embodiment, the permission module may also be connected to database 1811 (or any other database) in order to store and archive each recipient's authorizations. Such data may then be used to determine those recipients that are to receive particular services.

Figure 8:
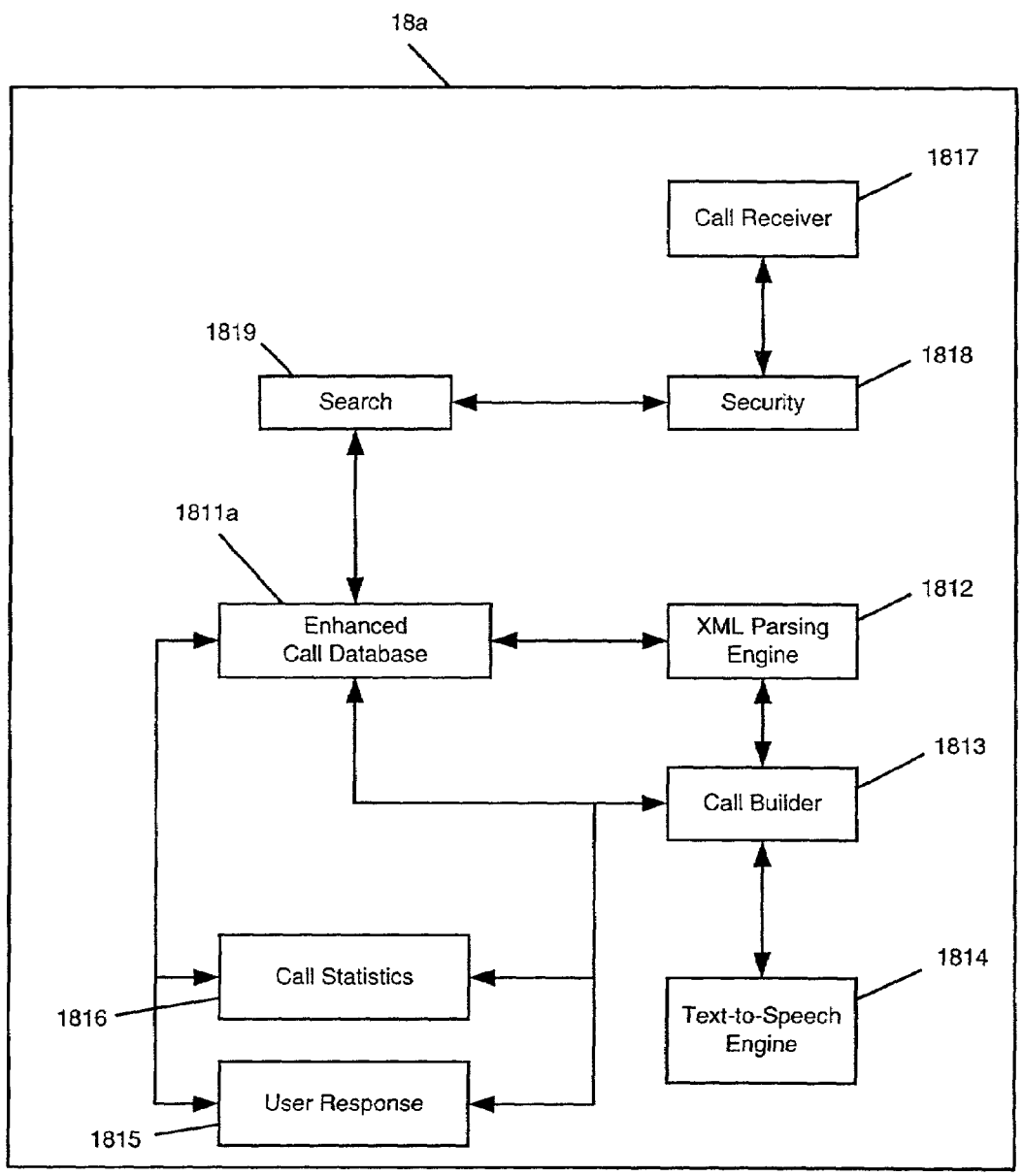
FIG. 8 is a block diagram of a call server configured to provide integrated inbound and outbound voice services.
Figure 8:
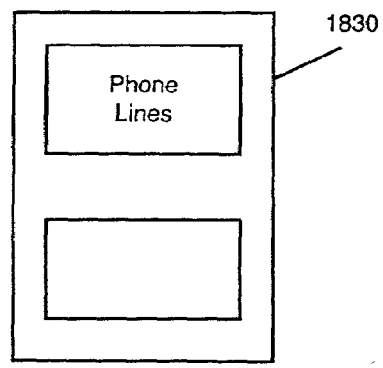

The process of FIG. 15 and the permission module discussed above may also be incorporated into call server 18*a* shown in FIG. 8 and used in conjunction with the system of the invention for receiving incoming call requests.

Figure 10:
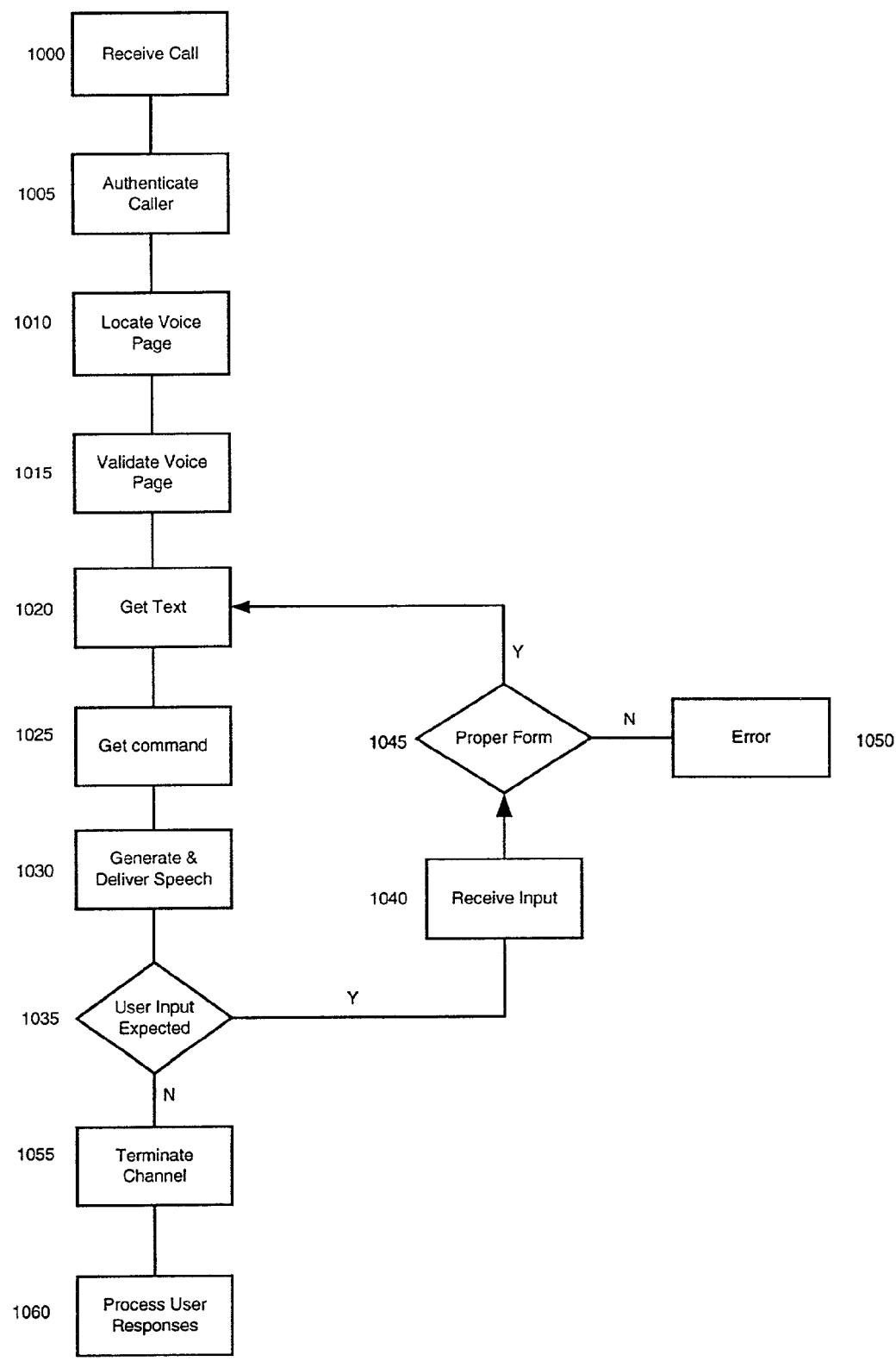
FIG. 10 is a flow chart of a method for generation of voice menus used to drive an interactive voice broadcast according to one embodiment of the invention.

One aspect of the invention is a system and method that receives calls and call requests from callers and enables them to access information by phone. This is accomplished by permitting callers to access specific active voice pages stored in a database that correspond to particular voice services. FIG. 10 is a flow chart generally showing a method enabling reception of a call request for a voice service such as through use of the embodiment of FIG. 3*a* with the call server 18*a* (as shown in FIG. 8.) The method of FIG. 10 may begin with reception of a call requesting one or more voice services (step 1000). According to one particular embodiment, when the method of FIG. 10 is used in conjunction with the method and system shown in FIGS. 1–8, a call is received by call receiver 1817 of call server 18*a* (shown in FIG. 8). Call receiver 1817 serves as the interface between the voice delivery system and the public telephone network, voice over IP or other voice-based delivery systems, for example. Call receiver 1817 may receive calls and route the incoming calls to security module 1818. According to one embodiment, call receiver 1817 may comprise software that configures call server 18*a* to receive calls.

Received calls may be forwarded to security module 1818 for authentication at step 1005. According to one embodiment, incoming calls are authenticated using login I.D.'s and passwords. In this instance, the caller, when prompted, inputs digit(s), character(s), or word(s) that personally identify the caller. The caller may input the requested information by entering a sequence of digits or characters using the telephone touch pad, or may speak the digits, characters, or words directly into the phone, or otherwise use an input device to input information that may be interpreted by the call server and security module 1818. The spoken phrases are then processed by speech recognition systems, or other similar systems.

According to another embodiment, an automatic number identification (ANI) system may be used to identify the caller; determine whether or not the user is calling from an authorized device; determine what device the caller is calling from; and/or to retrieve personal or custom information or parameters previously obtained from the caller. In this embodiment, the number of the telephone from which the caller is calling may be stored in enhanced call database 1811 (or other database) and may be further associated with personal information of the caller, such as the caller's name, biographical information, financial information such as bank account information and credit card account number, etc. This information may then be provided to the particular active voice pages of the voice services accessed by the caller to: personalize the interactive voice broadcast; facilitate and customize interaction therewith; and stream-line e-commerce or other interactive transactions. Other relevant information may be stored in the database, such as the caller's historical interaction with the system, preferred or popular voice pages, etc. The ANI system may be used with or in addition to receiving a log-in and password.

Once the particular caller is authenticated, the caller is able to search for or identify the voice service he or she would like to access (step 1010). The IVB of a voice service may be driven by one or more active voice pages, which are preferably XML-based documents. In one embodiment, the caller may use search module 1819 to locate the particular voice page. According to one embodiment, search module 1819 comprises a search engine designed specifically to search active voice pages. According to another embodiment, active voice pages utilize an XML-based language and search module 1819 comprises an XML-based search engine. According to another embodiment, search module 1819 comprises an SQL engine designed to make queries against a relational or other type of database.

A caller may search active voice pages in many ways. In one embodiment, a caller's request may be determined by the telephone number dialed, i.e., dialed number identification service ("DNIS"). According to this embodiment, the system may host multiple voice pages, each one representing a unique or distinct service. Callers may access specific services by dialing predetermined telephone numbers that correspond to the services. In this embodiment, a caller can automatically call into a particular voice service by dialing a telephone number corresponding to that particular service. Also, a caller may input information using the keypad or by speaking terms relating to the specific voice service, such as the name or category of the service. Further, the caller's ANI, in addition to being used for identification purposes, may be used to specify those voice services that the caller has historically preferred, or to designate or call-up a "home" or log-in voice service. The system may also maintain a log of some or all voice services sent to a caller (as is done by the system and method of outbound calling discussed below) and then present the user the option to select one of that user's most frequently used services. The user may also search for stored active voice pages by date, subject matter, or content. For example, the user may be prompted to enter or speak a date on or near which the desired voice page was executed, or the user may enter or speak a term associated with a particular voice service. The user may also use the telephone keys to enter a search term and search the content of any active voice page that they are authorized to access or that is not secure. Other possibilities exist for accessing active voice pages through inbound calling.

The active voice pages that are being searched may be stored in a database, such as enhanced call database 1811a (shown in FIG. 8). Enhanced call database 1811a is able to host numerous active voice pages associated with particular voice services. That is, the system 18a may host and maintain voice pages for various corporations, associations or individuals. Customers of these entities and individuals may then access the system by phone and verbally navigate through various voice services in a personal and customized fashion. In one embodiment, the user may browse the stored voice services by entering or speaking a request to do so; that is, the user may readily transfer between stored voice pages in much the same way one can browse web pages on the Internet. According to this embodiment, transferring between voice pages is enabled by a keyword directory that instructs the system where to go (i.e., what voice page to access) depending on the keyword spoken or entered by the caller. According to one embodiment, enhanced call database 1811a comprises a relational or other type of database. According to this embodiment, enhanced call database 1811a is used to store and categorize active voice pages and corresponding parameters, such as expiration dates for active voice pages, keywords indicating specific functionalities, etc. For example, an airline may desire to store an active voice page that customers of the airline can access by phone to obtain flight information. When accessing the airline's voice service, customers may request (by speaking or inputting digits or characters using keypad) to be transferred to "RESERVATIONS" or to be presented with a "FLIGHT SCHEDULE."

Enhanced call database 1811a may also be used to store personal or custom information corresponding with specific callers, such as ANI, name, biographical information, financial information, etc. Other personalized information that may be stored include historical transactions of individual callers, as well as any information that enables the system to accurately predict an incoming caller's desired services; that is, information the system is able to use to personalize content delivered to a caller based on how the caller has historically interacted with the system and/or individual voice pages. Examples include the typical voice services accessed by a particular caller from a particular telephone; the time which a call request is made; the day on which a call request is made; specific services within voice pages typically requested by a caller. For instance, suppose a caller usually calls the system on Friday nights at 6 PM and requests a voice page relating to movie times and showings. Based on this pattern, the system may infer or predict that each time the caller calls in at 6 PM on a Friday, they are inquiring about movie times and showings. The system may anticipate the request and present the caller with the relevant voice page(s). Another caller, for example, may typically request stock quotes every business day at 5:30 PM. The system may infer or predict that a future call from the caller at 5:30 PM on a business day is related to closing stock prices and therefore immediately present the caller with all relevant voice page(s). Based on these call patterns or characteristics, the system of the invention may predict the desired voice services and thus provide the caller with an efficient and personalized IVB. In another embodiment, the personal or custom information corresponding with specific callers may be stored in a separate database that may be remotely located from, but accessible by, call server 18a. Other storage possibilities are possible.

Once the desired active voice page (or TML document) is located, it may be validated (step 1015). According to one embodiment, the validation of the TML document comprises determining whether or not the TML document has proper beginning and ending TML tags. That is, validation of the TML comprises determining whether or not the TML document is complete. According to one particular embodiment, TML validation is accomplished by TML parsing engine 1812 of call server 18a.

Upon successful validation, the text to be spoken to the caller is accessed in step 1020. According to one embodiment, text is accessed through a command to TML parsing engine 1812 to "GetNextStep" along with the argument "person" According to this embodiment, such a command directs control of the TML parsing engine to a portion of the TML document that contains content to be read to the user. Other command structures could be used.

In step 1025, a command is also accessed. According to one embodiment, the command comprises instructions on what to do after the text accessed in step 1020 is delivered to the user. According to various embodiments, the command may comprise a command to terminate the call, a command to wait for a single digit input from the user, or a command to wait for a multiple digit input from the user. Other commands are possible. According to one particular embodiment, the command that is accessed is part of the TML document that controls the IVB.

In step 1030, the message to be spoken to the user is generated and delivered. According to one embodiment, the text accessed in step 1020 is converted to speech and delivered to a user. According to one particular embodiment, the text accessed in step 1020 is sent to text-to-speech engine 1814 and converted to speech that is delivered to a user through the established call channel.

According to another embodiment, the text is generated and delivered in a manner dictated by style properties selected for the caller. As was discussed above, user-specific personal information may be stored in enhanced call database 1811a, or any other database. This information indicates how generated text is to be delivered to a caller. For example, the user may have the option of choosing the language styles (e.g., the French/English, female/male) during the IVB. As another example, the user may choose short or long forms of menus ("If you would like to hear more information press 9" vs. "More information, press 9") during the IVB. According to an alternative embodiment, the manner in which the text is generated and delivered to a user may be selected or altered during the IVB by the user.

In step 1035, a determination is made whether or not user input is expected. According to one embodiment, the determination is made based on the command accessed in step 1025. According to this embodiment, based on the TML document, the command determines what is to be done after delivering text to the user. For example, if the text to be delivered to a user was part of a Prompt element or an Option element, the voice service system expects a response from the user.

If user input is expected, control passes to step 1040 where user input is received. According to one embodiment, user input is received using standard telephony technology to interpret a user's keypad presses. According to another embodiment, speech recognition software is used to receive and interpret a user's spoken response. According to a particular embodiment, user responses are received at call builder 1813 through telephone lines.

Next, it is determined whether or not the user input is in the proper form (step 1045). As mentioned above in conjunction with step 1025, user input may comprise a single digit or may comprise multiple digits or other forms of input depending on the dialog from which it originated. According to one embodiment, in step 1045, when it is determined whether or not a user input is in the proper form, the user input is checked against the criteria specified in the TML element that defined it. At the beginning of step 1020, TML engine 1812 has the internal variables for the current call, the current position in the TML document, and the last user input. Thus, the TML engine 1812 knows what input to expect from a user because that type of input is specified in the TML element that generated the text and the command. For example, the TML element <PROMPT type="fixed" length="3" filter="\n gt 50 and \n lt 150" next="main"/> accepts a three digit number (Type="fixed", Length="3") that falls in the range between 50 and 150. If a user entered a number that meets these criteria, this PROMPT element will be executed. Other command structures are possible.

If user input is not in the proper form, an error message is returned in step 1050. According to one embodiment, step 1050 comprises accessing a portion of the TML document that contains an error message to be delivered to the user. In particular, if it is determined that the user has entered an improper input form, a command "GetNextStep" along with the argument error is returned to XML parsing engine 1812. In response to this command, XML parsing engine 1812 accesses a portion of the XML document which contains a response notifying the user that they have entered an erroneous form of input. The user may then be prompted to enter the proper input.

If in step 1045 it is determined that the user input has taken the proper form, control is passed to a new dialog element. According to one embodiment, the "GetNextStep" with the argument "next" is used to transfer control to a different dialog element. This dialog element could be in the same TML document, or in a different TML document. If the TML element is in a different TML document, the full URL of the TML document is specified. Other command structures are possible.

When the next dialog element has been determined, control is passed to step 1020 where the next text to be spoken to the user is accessed. Similar to that described above, according to one embodiment, the next text to be spoken to the user is accessed using a command "GetNextStep" with the argument that comprises the user response. Thus, the user response acts as a pointer, to a new portion of the TML document containing the next text to be spoken to the user.

TML elements that request user input (i.e., Prompts and Options) may also include "store" and "remove" attributes that update the response collection. According to one embodiment, a "store" attribute indicates that the user response should be added to the response collection and the "remove" attribute indicates that a particular variable is to be removed if a certain response is received. Other attributes are possible. Thus, after it is confirmed that an input of the appropriate form has been received, any "store," "remove" or other attributes are executed and result in changes of the variables.

Returning to step 1035, if it is determined that no user input is expected, control passes to step 1055 where the logical call channel is terminated. According to one embodiment, the logical call channel is terminated by breaking the connection with the user.

In step 1060, any user response returned during the course of the call is stored for processing. According to one particular embodiment, responses received during the call are processed as discussed in conjunction with FIGS. 1–8. According to another embodiment, user responses may be processed during the course of the call. According to this embodiment, after user input has been received in step 1035 and verified in step 1040, the user response is forwarded to the appropriate module for processing. According to one embodiment as described in conjunction with FIGS. 1–8, the user response may be used to generate a database query against database system 12 (as shown in FIG. 3a). According to this embodiment, voice transmission of OLAP may be output to the caller. For example, a caller may call the system and have content delivered audibly over the telephone or other voice-enabled terminal device.

During the IVB, information may be exchanged between the system and the caller. The system conveys content to the caller and the caller may respond by speaking or pressing one or more buttons on a telephone touch pad dial (or other input mechanism) to hear more information, to exercise options, or to provide other responses. This interaction shapes the structure of a basic exchange between the system and the caller. During or after the call is terminated, the caller's responses may be stored and processed (e.g., by other applications). According to another embodiment, the user response may be used to complete a real-time e-commerce transaction.

According to yet another embodiment, a command to transfer to another active voice page is also available. In this embodiment, a caller is able to request immediate transfer to another voice page by inputting predetermined digits in a keypad or by speaking the request. In one embodiment, this particular command is available throughout the duration of the IVB (i.e., running in the background) so that users can request transfer at any location of a voice page. If transfer is requested, the method returns to step 1010 to search for the desired page. According to each of the above embodiments, when the transaction is completed, control is returned to step 1020 and additional text to be spoken to a user is accessed.

Figure 11:
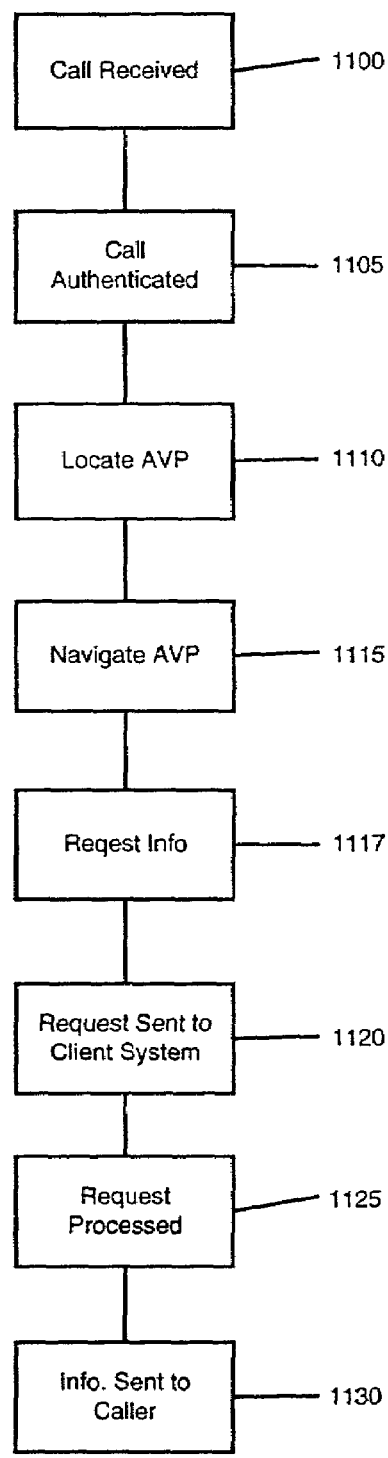
FIG. 11 is a flow chart of a method of using a voice service bureau according to an embodiment of the present invention.
Figure 12:
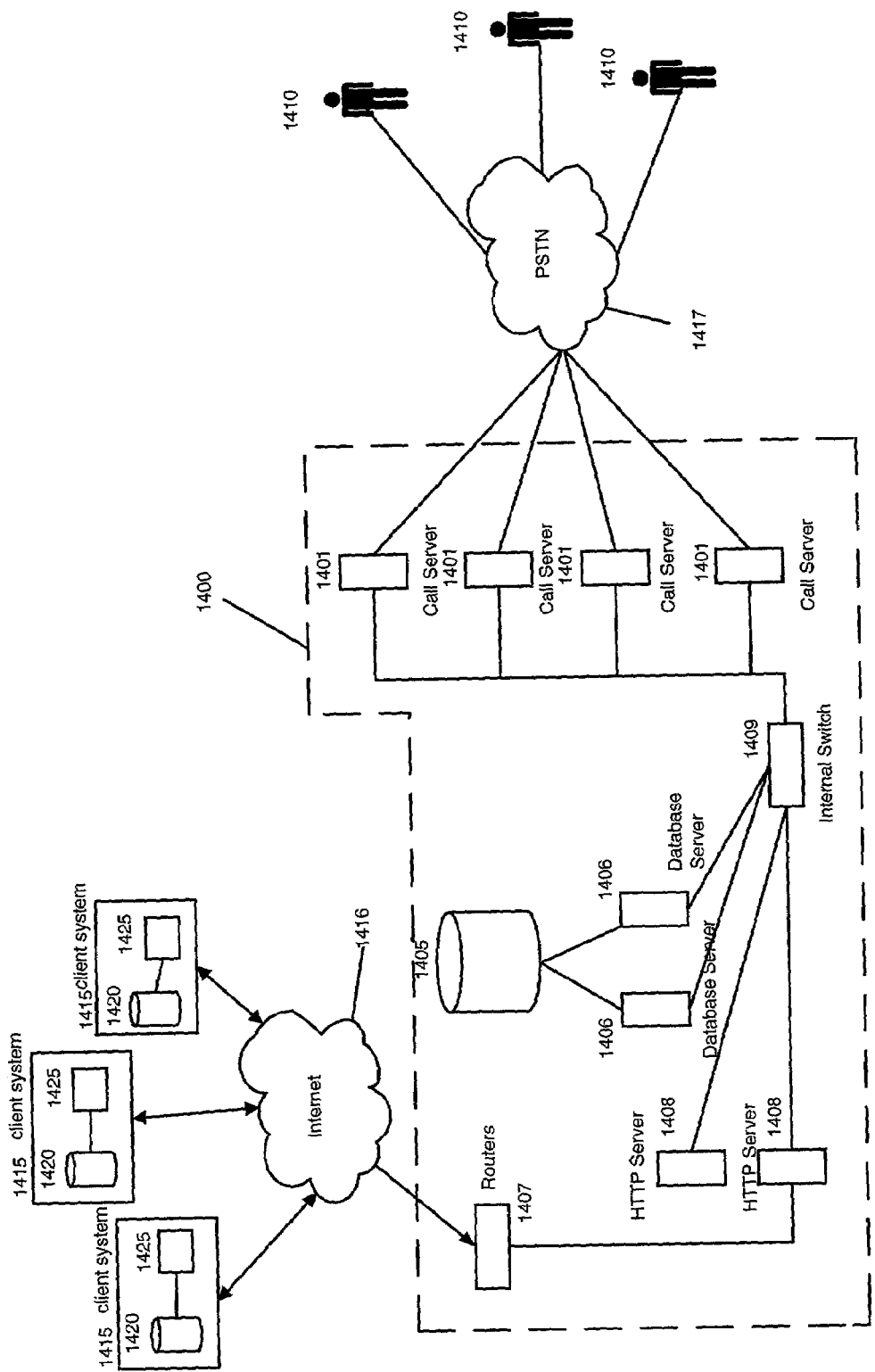
FIG. 12 is a schematic block diagram of a voice service system incorporating a voice service bureau according to one embodiment of the present invention.

FIG. 11 shows a method for processing inbound calls from callers requesting information using the voice service bureau (VSB) 1400 shown in FIG. 12. Using this embodiment, users (or clients) of a VSB will rely on the telephony hardware and software of another entity. In such a case, a VSB may be maintained at a remote location to: receive incoming calls from callers; store active voice pages; and route information requests to the appropriate client systems 1415 for resolution against a database 1420. A method of using a VSB and a VSB according to various embodiments of the present invention are described in FIGS. 11 and 12, respectively.

In one embodiment, a VSB 1400 may comprise one or more call servers 1401 and call databases 1405 that are centrally located and able to receive incoming calls and requests from callers 1410. In this way client systems 1415 do not need to invest in acquiring and maintaining call databases, call servers, additional telephone lines and other equipment or software. Moreover, the VSB facilitates weeding out usage of illegal numbers and spamming by number checking implemented through its web server. VSB 1400 may also include database servers 1406 associated with database 1405, as well as router 1407, HTTP servers 1408, and internal switch 1409.

According to one embodiment, the VSB 1400 is maintained at a location distant from the client systems 1415 and is connected thereto via communications network, such as the Internet. Other communication networks are possible. At step 1100, call servers 1401 of VSB 1400 (call servers 1401 are identical to call server 18*a* shown in FIG. 8) receive incoming calls from callers 1410. The call may be placed by a standard telephone, cell phone, or other voice-enabled device that can be used over a voice network 1417 such as, for example, the Public Switched Telephone Network (or PSTN). The caller may dial a telephone number that corresponds to a particular voice service, or may dial a number associated with a general greeting voice page that presents the caller with several options regarding the available services, i.e., voice pages.

Once the call is received, it may be authenticated at step 1105 to ensure proper access to the VSB and to the client systems serviced by the VSB. In one embodiment, the caller is automatically prompted to enter a login identifier and a PIN. Also, an automatic number identification (or ANI) system may be used, exclusively or in addition to a login identifier and PIN system, to determine whether or not the user is calling from an authorized device. Speech recognition technology may also be utilized to identify a caller. According to this embodiment, voice prints for each user of the voice service system may be stored as identifiers. When an inbound call is received, pattern matching techniques are used to verify the user's speech against the previously stored voice prints. Other security measures are possible.

Once the call is authenticated, at step 1110 the caller is able to search or locate the desired voice service. Specifically, the caller is able to search for the active voice page that corresponds to the desired voice service. In one embodiment, the active voice pages to be searched are stored within database 1405. According to this embodiment, the system may maintain a log of all voice pages contained in database 1405 and provides an inbound caller an option to select one of several voice services. The voice services presented may include the caller's preferred services, or may consist of the list of services frequently visited by the caller. According to another embodiment, the caller is allowed to search stored voice pages by date or content. For example, the caller may be prompted to enter a date on or near which the desired voice page was executed, or the caller may speak or use the telephone keys to enter a search term and search the content of any stored active voice page that they are authorized to access or that is not secure.

Other possibilities exist for accessing active voice pages through inbound calling. According to one embodiment, the caller is automatically placed into an active voice page of a voice service that the caller missed (outbound calling by the bureau is discussed below). That is, the system chooses an active voice page that it was unable to deliver. According to this embodiment, when a call is undeliverable (e.g., when an answering machine picks up), the active voice page for that call is placed in memory in a "voice site" table or as an active voice page on a web site and addressed using the user's identification. When the caller calls in to retrieve the voice service, after the caller logs in, the table or web site may be searched for an active voice page that corresponds to their identification. If such a page exists, it is executed by call server 1401.

Once the correct active voice page is located, the caller navigates through the active voice page in step 1115. As described above in connection with FIG. 10, a caller navigates through an active voice page by exercising options, responding to prompts and otherwise entering input to the system. Further, a caller may browse between various active voice pages stored in database 1405.

A caller can also request information made available by the accessed voice page, as shown in step 1117. For example, the active voice page of an airline may prompt the caller with the option to access a list of all flights leaving Washington D.C. area airports and arriving at Miami International Airport, or any other destination(s) the caller may have previously indicated. The caller may speak or enter his response using the keypad of the telephone or other device. If the caller desires the information, at step 1120 the VSB sends the caller's request to the voice service, preferably through the Internet using secure HTTPS. HTTPS provides a secure exchange of data between the client systems and the VSB using asymmetric encryption keys based on secure server certificates. In another embodiment, SSL HTTP protocol is used to send a call request to the voice service bureau. Both of these protocols help ensure that a secure channel of communication is maintained between the voice service system and the voice service bureau. Other security techniques may be used.

At step 1125, the client server 1425 processes the caller's requests and performs a query against a database 1420 to obtain the requested information. According to one embodiment, the request against the database is made using SQL statements. According to this embodiment, the client system functions like intelligence server 16 discussed below in connection with FIGS. 3*a* and 3*b* except the call server functionality of call server 18 (as shown in FIG. 3*a*) is handled by VSB 1400. According to one embodiment, client systems 1415 comprise a database 1420 and DSS server 1425 that collectively comprise an OLAP system that generates caller-specified reports from data maintained by database 1420. Database system 1420 may comprise any data warehouse or data mart as is known in the art, including a relational database management system ("RDBMS"), a multidimensional database management system ("MDDBMS") or a hybrid system. DSS server 1425 may comprise an OLAP server for accessing and managing data stored in database system 1420. DSS server 1425 may comprise a ROLAP engine, MOLAP engine or a HOLAP engine according to different embodiments. Specifically, DSS server 1425 may comprise a multithreaded server for performing analysis directly against database system 1420. According to one embodiment, DSS server 1425 comprises a ROLAP engine known as DSS Server™ offered by MicroStrategy. Client system 1415 may also include the additional functionality described below in connection with intelligence server 16 of FIGS. 3*a* and 3*b*.

At step 1130, the client system 1415 sends the information requested by the caller back to VSB 1400 via the communications network. VSB 1400 then transmits the information to the caller via the voice network and awaits the next caller command or instruction. In one embodiment, call server 1401 generates speech from the information received from call system 1415, and delivers the generated speech to the caller over the voice network.

Figure 11A:
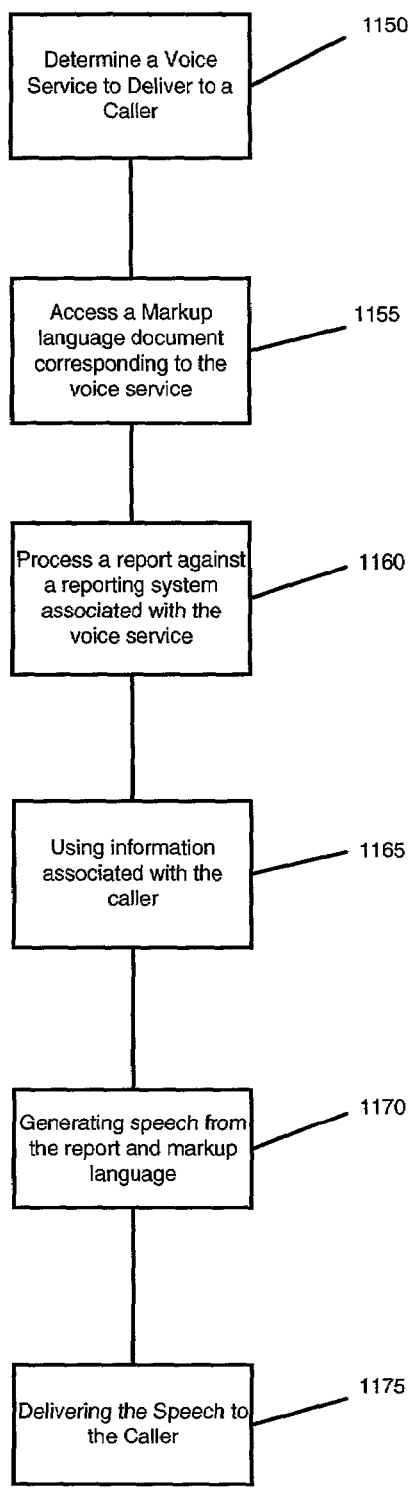
FIG. 11a is a flow chart of a method of drilling a database according to an embodiment of the present invention.

FIG. 11*a* shows a method for processing inbound calls and requests from callers requesting reports of information stored in a database. At step 1150, a call or request is received from a caller initiating a session with any of the systems described herein, and a determination is made as to which service or page is to be delivered to the caller. According to one embodiment, the service is determined by the caller who may speak or input the name of the desired voice page. In another embodiment, the service is determined based on the identity of the caller. More specifically, the system may determine particular services preferred by the caller based on information such as the caller's name, telephone number, address, past transactions by the caller, the last page accessed by the caller, and any other personal information relating to the caller that may be used to personalize content delivered by the system. In another embodiment, determination of a voice service is determined by ANI. In this embodiment, the system determines the appropriate voice page based on the location or other personal information of the caller stored within the system and related by ANI. The personal information associated with particular callers may, as was previously discussed, be stored in enhanced call database 1811*a*. Once the appropriate voice service is determined, at step 1155 the system may access the voice page or markup language document associated with the service. According to one embodiment, this may be done using search engine 1819.

Next, at step 1160 the system may process a report against a reporting system associated with the voice service delivered to the caller. The reporting system may correspond to remote servers and databases (i.e., client system) exemplified in FIG. 12. For example, assume a caller has accessed the page of an Internet auction site on which the caller posts items for sale. As an authorized user of the service, the system may permit the caller to obtain information about the products or services for sale by drilling a remote database by phone. The database may be remotely located and may contain specific information about the caller and other information relating to the auction service page, such as the total number of items for sale, and the total number and amount of bids. According to one embodiment, the caller may speak or input a request for particular information such as, for example, "TOTAL BIDS." In response, the system may query the corresponding database containing the desired information by relaying the caller's request to the reporting system, which may comprise the client systems shown in FIG. 12. Specifically, the system may directly query the database containing the information, or may transfer the request to a database server that may itself resolve the request against the database. In either case, the corresponding reporting system generates a report responsive to the caller's request.

At step 1165, the system receives the report and personalizes delivery of its content to conform with caller's preferences which may or may not have been predetermined. The caller's preferences may be stored as described herein in connection with the systems and methods of FIGS. 1–14. At step 1170, the speech is generated from the report and is thereafter transmitted or delivered to the caller over the voice network at step 1175. Upon receipt of the report, the caller may initiate a follow-up request for information to be resolved against the same database or against a different database altogether. The caller may also transfer to another page as discussed herein, or to terminate the session and exit the system.

The above described systems and methods generally relate to enabling callers to obtain information on the fly in an efficient and reliable manner. Another aspect of the present invention is the ability to provide each caller with dynamic personalization and customization of content during interaction with the system. According to one embodiment, each caller receives personalized content based on how that caller has interacted with the voice page in the past. For example, suppose a caller calls in daily at 6 PM to a voice page related to train reservations. Based on the nature of the caller's past calling pattern, the system can infer or predict that future calls coming in from the caller at 6 PM relate to making train reservations. This way, the system can efficiently provide the caller with requested information without the caller having to work through several unnecessary menus or options. In another example, the system is able to generally recognize that numerous callers call in each business day at around 6 PM to make train reservations. Based on this pattern, the system is able to infer or predict that any future calls coming in at 6 PM each business day are likely to relate to train reservations. Accordingly, the system can offer those callers a special menu or list of voice pages where the focus of the voice pages presented relate to business travel.

Other determinations may be made by the system. In yet another embodiment, the system determines caller information for certain requests. Assume, for example, that a caller is browsing the voice page of a popular Washington, D.C. monument and would like directions to the monument. The caller speaks a request into the phone, such as, for example, by saying "DIRECTIONS." Upon processing the request, the system determines that the caller would like directions from the address associated with the caller's ANI or other identification source obtained from the caller at reception of the call. Upon making this assumption, the system passes the caller's request to the appropriate voice page or application (e.g., Mapblast, Mapquest, etc.) along with location information about the caller. The directions-generating voice page or application can then efficiently process the request. Other like determinations may be made by the system using the following general process flow.

Figure 13:
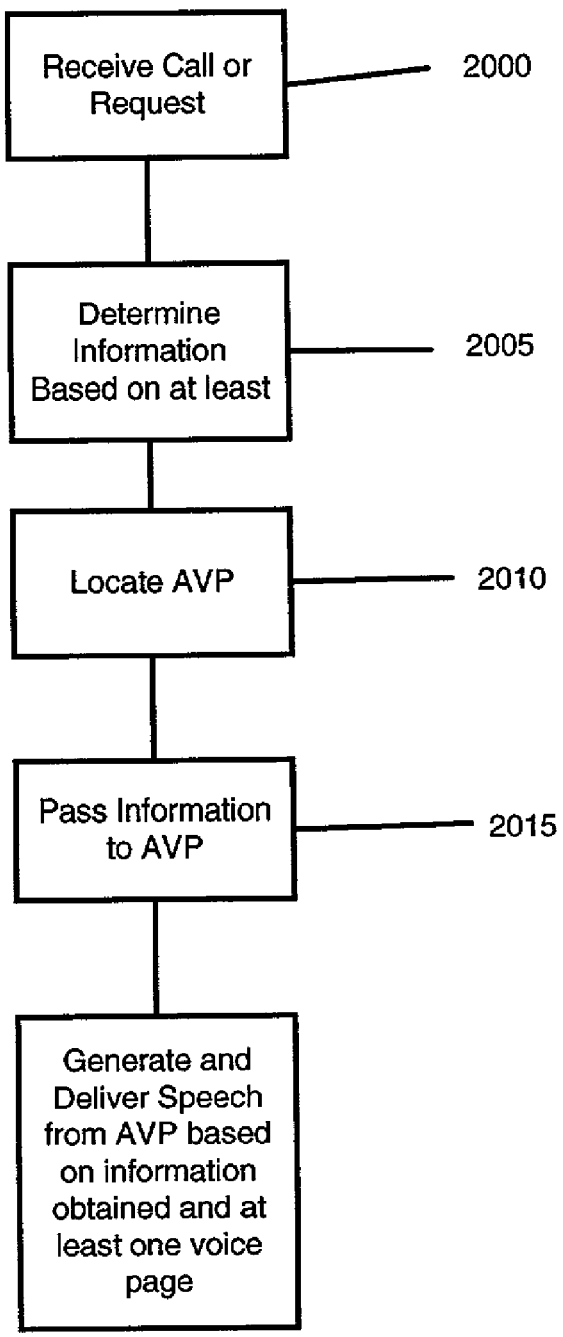
FIG. 13 is a schematic flow chart of a method for inferring or predicting the purpose of an incoming call or request.

FIG. 13 shows a process flow of a method for anticipating the voice service(s) desired by an incoming caller based on information obtained about the caller, call and/or request. The process flow relates to the incoming call systems discussed above and shown in FIGS. 10–14. However, the process flow may also relate to call requests made with the system and method described in FIGS. 1–6. In step 2000, a call is received by call server 18*a* (shown in FIG. 8). During reception of the call, the system obtains information about the caller, call and/or request. Examples of caller information obtained include the name and address of the caller, the caller's date of birth, the caller's social security number, credit card numbers belonging to the caller, security information specific to the caller such as PIN numbers and passwords, and any other information that may be relevant to interaction with voice services. Examples of call or request information include the date and time of the call or request; the area code, telephone number, or other location information about the device from which the call is placed; the location from which the request is made, i.e. the voice service or application from which a request is made, if any; and any other information that may be relevant to interaction with voice services. Other relevant information may be obtained.

In one embodiment, information may be obtained by requesting log-in information such as the caller's ID and password. The caller's input in response to this request may then be used to obtain personal information that may be stored in a database, such as enhanced database 1811*a* (shown in FIG. 8). In another embodiment, caller and call information may be obtained via ANI. In this embodiment, the area code and telephone number from which the call is made is determined and then used to obtain information about the caller and/or call that may be stored in a database, such as enhanced database 1811*a*.

Figure 14:
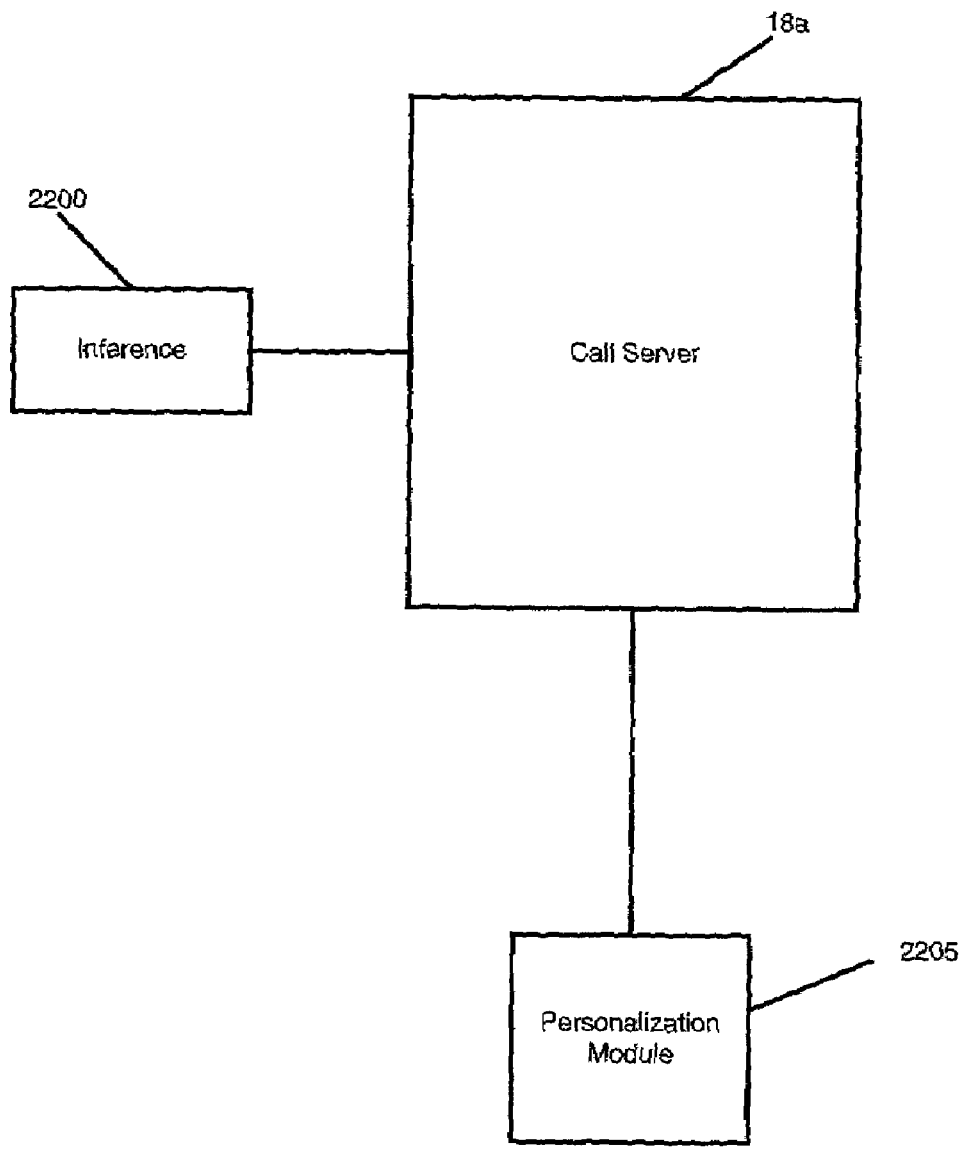
FIG. 14 is a schematic block diagram of a call server configured to anticipate desired voice services.

Next, at step 2005 the system determines the desired voice page(s) based on the caller, call, or request information obtained. In one embodiment, the inference is made by an inference module 2200 that may be connected to (or be a part of) caller server 18*a*, as shown in FIG. 14. Inference module 2200 processes the information obtained, such as the caller's identification, time of the call, etc., and determines or anticipates the voice service(s) the caller is interested in accessing. In one embodiment, inference module 2200 performs this step by relating the information obtained to data contained in a database (such as enhanced database 1811*a*). The stored data may regard past historical transactions by the caller, callers in general, and/or the historical call patterns or transactions of the device from which the incoming call was made.

In one example, the desired voice service(s) are determined based on caller information obtained. For example, assume a particular caller requests voice services relating to sports each time he calls in to the system. Based on this pattern, each time the system identifies the caller in future calls it may anticipate the caller's desire for sports services and present the caller with all corresponding voice page(s), rather than have the caller work through several pages or menus before the desired services are delivered.

In another embodiment, the desired voice service(s) are determined based on call information obtained, irrespective of the caller's identity. For example, assume a high volume of calls come into the system every Friday night at 6 PM requesting movie times and theater showings. Based on this information, the system may infer that calls coming in on future Fridays at or around 6 PM are placed by callers desiring movie times and showings. The system may present those callers with various voice page(s) regarding theater showings and times. Further, the system may also determine the specific caller's location by determining the area code from which the call is placed, and thereafter present those voice pages relating to theater showings and times in the caller's surrounding area. The system may also anticipate the desired voice services based on a combination of caller and call information.

Once the desired voice service(s) are determined, at step 2010 the system searches for the voice page(s) that correspond to the desired voice services. In one embodiment, search engine 1819 locates the voice page as described herein. Once the voice page(s) are located and called up, at step 2012 the system may fill-in parameters in the voice page(s) relevant to caller, call or request information that may facilitate interaction between the caller and the voice page. In one embodiment, this may be accomplished by personalization module 2205, which functions to fill-in parameters in the destination page based on appropriate tag-data record matches. For example, this may be accomplished by accessing a mark-up language document corresponding to the destination page and completing tags in the mark-up language document with the stored call, caller, or request information to personalize the page for delivery and output to the caller. This information may change as the caller navigates through a network of pages and information delivery so that the session information is updated with the most recent updated session information used to provide personalized voice output. For example, assume a caller at the Washington Monument page requests directions to the monument. The system may determine or anticipate that the caller desires directions from the location of the device from which the call is made. The system then transfers the caller to the voice page that generates the directions and the caller's location information to the page. Specifically, personalization module may fill-in the "TO" parameters of the directions generating page with information of the Washington Monument and fill in the "FROM" parameters with information about the caller's location. Personalization module 2205 may also perform the function described above in connection with inference module 2200; that is, personalization module 2205 may both determine the voice services desired by a call or request and personalize the voice output based on information about the caller, call or request.

At step 2015, the system generates and delivers speech to the caller based on at least one voice page or markup language document, and information about the caller, call and/or request.

The system of the invention may also be used to directly map from one voice content system to another, i.e. to permit deep-linking into another page's voice content. This process permits a caller to transfer between voice pages irrespective of the caller's location within an originating voice page, and even if the caller does not provide an accurate request or requests a page or service not hosted by the system. For example, assume a caller is at the voice page of the Washington Monument and instead of stating "DIRECTIONS" says the name of a recognized directions generating page, such as "Mapblast." Assuming further that the pages hosted by the system do not include Mapblast, the system may be programmed to nonetheless recognize the caller's request and to transfer the caller to a hosted page that provides directions, such as "Mapquest." In one embodiment, the system may use a keyword directory against which a caller's request may be resolved to determine the appropriate voice page to transfer to. The keyword directory may also include information regarding how to deep link or transfer to the other page. In this embodiment, the key word directory may indicate that should the caller. The keyword directory may be stored in a database, such as enhanced database 1811*a*, or any other database in communication with call server 18*a*. The key word directory may be maintained and updated by an administrator of the system having authority to manipulate the various instructions and directions handled by the system.

According to another embodiment, the system transfers the caller to another voice delivery system that subsequently takes the user directly to the correct or desired page or service. In this embodiment, the system transfers the caller as well as information about the caller and the call to the new voice delivery system. The receiving voice delivery system may then transfer the caller to an appropriate page as well as fill-in the information of the caller and call in order to provide the caller with personalized and dynamic delivery of content.

The system described herein may also be used to browse and drill the contents of reports using voice recognition technology. According to one embodiment, the system uses a grammar look-up table that is dynamically generated based on the contents of a report. For example, assume a caller requests a report relating to the number of bids placed by bidders on an item listed in an Internet auction page. Upon generation and delivery of the reports content to the caller, the system may receive subsequent requests by the caller to drill specific parts or portions of the reports. For instance, a report may provide the caller with the total number and amounts of bids placed by bidders since initiation of an auction. The grammar look-up table associated with this report may include words or terms corresponding to specific information contained within the report such as, for example, the number of bids, the total amount of bids, the names and addresses of individuals placing bids, and any other information that may be relevant to the placing of a legitimate bid in the auction. Upon receiving the report, the caller may wish to refine the report to generate total bids and amounts placed by individuals that reside in the Washington D.C. metropolitan area. The caller's request may then be resolved against the grammar look-up table which provides the system with an instruction of what to do next, including personalization instructions on delivery of content to the caller in a personalized and customized way. According to one embodiment, this function may be performed by a drilling module operating in the background of an ongoing voice session between a caller and the system. The drilling module may be associated with call server 18*a* and the system and methods shown in FIGS. 1–12.

The system described herein may also be used in conjunction with Dialed Number Information Service (or "DNIS") to provide personalized content to callers. According to this feature, the system may be used to present different voice pages or services that may be accessed by callers by dialing specific predetermined telephone numbers. Using this feature the system may provide a backbone for multiple different access sellers. For example, caller's may obtain movie theater information by dialing a specific telephone number that will link them to the corresponding voice page(s) following reception of the call. This way caller's may access desired information immediately and efficiently without having to work or sort through numerous menus options or pages. According to another embodiment, caller's may predetermine or preprogram speed dialing codes or digits (e.g. *2) that correspond to specific voice services or pages. In another embodiment, the system may be used to advertise specific products or services about which caller's may obtain information by dialing a telephone number or code corresponding to the desired service or product.

The systems described herein may also be used to permit caller's to transfer between voice pages and services at will, irrespective of their location within a current page. Further, the systems may permit the linking of a voice page to data contained at a remote location. The method and system shown in FIGS. 11 and 12, respectively, are examples of the ability to link a voice with external or remote data. There are other examples. According to one embodiment, a transactions engine is provided that operates to receive and execute a caller's transfer request or instruction. The transaction engine may be located within or connected to call server 18*a* (as shown in FIG. 8) and used in conjunction with the systems and methods described in FIGS. 1–14. In operation, transaction engine may be engaged whenever the caller states or inputs a request that corresponds to a transfer instruction. For example, assume a caller is browsing or navigating the voice page related to train service in the northeast between New York and Washington D.C. and is inquiring as to train schedules for the coming weekend. Assume further that the caller is dissatisfied with the available options and decides to consider flying as an alternative. At this point in the session the caller may speak "airline travel" and the system will present the caller with relevant voice page(s) offering information on flight schedules and reservations. Further, the system may directly transfer the caller to a specific page, or may do so upon selection by the caller of a preferred or desired page.

Figure 9:
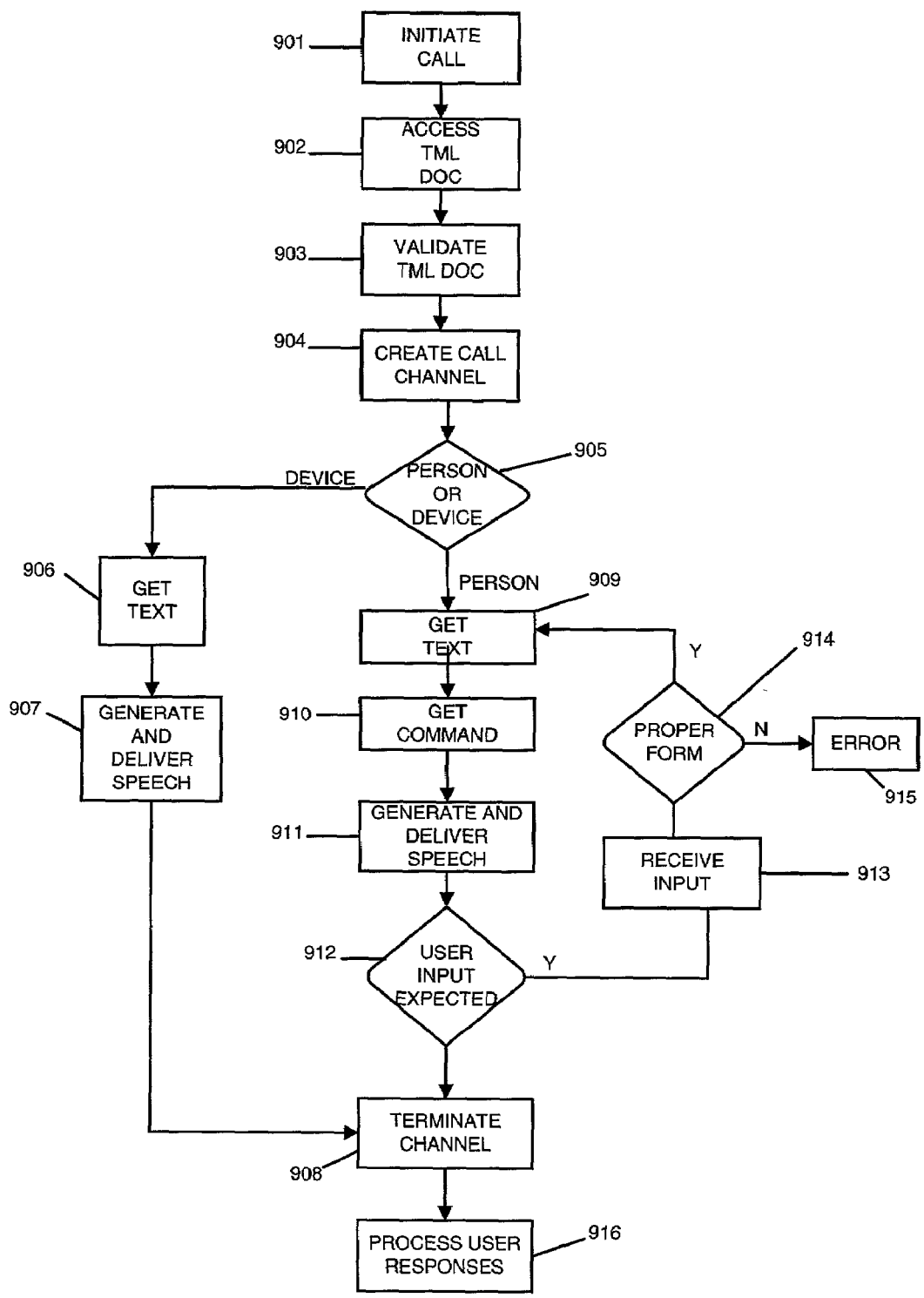
FIG. 9 is a flow chart of a method for on-the-fly generation of voice menus used to drive an interactive voice broadcast according to one embodiment of the present invention.

The system described above may also be used to generate outbound voice service calls with an outbound system. Such a system may be as described in FIG. 9 and FIGS. 1–8. FIG. 9 is a flow chart showing a method enabling real-time content and speech generation in accordance with one embodiment of the present invention. The method of FIG. 9 begins with initiation of a call (step 901). According to one embodiment, a call is initiated by reading a record from a call process table in a database. According to one particular embodiment, when the method of FIG. 9 is used in conjunction with the system shown in FIGS. 1–8, a call is initiated when call server 18 reads a call string from call database 1811. According to one particular embodiment, a call is initiated by an incoming call. Standard telephonic hardware and software may be used to detect an incoming call. When the method of FIG. 9 operates in conjunction with the system shown in FIGS. 1–8, an incoming call may be received on phone lines 183 and a caller verified as described below.

A TML document for the call is accessed in step 902. According to one embodiment, when operating in conjunction with the system of FIGS. 1–8 a TML document is stored in call database 1811 and sent to XML parsing engine 1812 when the call is initiated. According to another embodiment, when an incoming call is received, the TML document is accessed from call database 1811 using a simple search as described below in conjunction with FIGS. 1–8.

In step 903, the TML document is validated. According to one embodiment, the validation of the TML document comprises determining whether or not the TML document has proper beginning and ending TML tags. That is, validation of the TML document comprises determining whether or not the TML document is complete. According to one particular embodiment, when the method of FIG. 9 is used in conjunction with the system shown in FIGS. 1–8, TML validation is accomplished by TML parsing engine 1812 of call server 18.

A call channel is created for the call in step 904. According to one embodiment, creating a call channel comprises among other things, establishing a physical call and a response collection to maintain state and variable information for the duration of the call. For example, during an IVB a user may provide responses to particular menu options given. Those responses are stored in variables and maintained throughout the call as described in more detail below. According to one embodiment, establishing the physical call comprises establishing an actual connection between the user and the voice service system. According to one particular embodiment, when the method of FIG. 9 operates in conjunction with the system of FIGS. 1–8, the response collection is stored in user response module 1815 and a connection is established using phone lines 183.

In step 905, a determination is made whether the voice service system is connected to a person or a device. According to one embodiment, this determination is made using a simple user prompt. If no response to the prompt is received it can be determined that the system is connected to a device. If a response is received, it can be determined that the system is connected to a person. According to one particular embodiment, when the method of FIG. 9 is used in conjunction with the system of FIGS. 1–8, the device/person determination is made using a software module in call server 18. Other embodiments are possible.

If the system is connected to a device, the method proceeds to step 906. In step 906, text of a message to be left on the device is accessed. According to one embodiment, when the method of FIG. 9 operates in conjunction with the system of FIGS. 1–8, text is accessed using a call to TML engine 1812 to "GetNextStep" along with the argument "device." This request to TML engine 1812 directs control to a portion of the TML document containing the text of a message to be left on the user's device. According to one embodiment, the message may comprise a notification that the user has received a voice service and a number that the user may call to access that voice service.

In step 907, the text that is accessed is spoken to the device. According to one embodiment, the text of the message to be left for the user is converted to speech and delivered to the device. According to one particular embodiment, when the method of FIG. 9 is used in conjunction with the system of FIGS. 1–8, the text of the message is forwarded to text to speech engine 1814 and converted to speech in real-time as described below.

After the message is spoken to the user's device in step 907, the call channel is terminated in Step 908. According to one embodiment, when a call is received by a device, there are no user responses to process and thus the method of FIG. 9 terminates.

Returning to step 905, if it is determined that the voice service system is connected to a person, text to be spoken to the person is accessed in step 909. According to one embodiment, when the method of FIG. 9 is operating in conjunction with the system of FIGS. 1–8, text is accessed through a command to TML parsing engine 1812 to "GetNextStep" along with the argument "person." According to one embodiment, such a command directs control of the TML parsing engine to a portion of the TML document that contains content to be read to the user. Other command structures could be used.

In step 910, a command is also accessed. According to one embodiment, the command comprises instructions on what to do after the text accessed in step 909 is delivered to the user. According to various embodiments, the command may comprise a command to terminate the call, a command to wait for a single digit input from the user, or a command to wait for a multiple digit input from the user. Other commands are possible. According to one particular embodiment, the command that is accessed is part of the TML document that controls the IVB.

In step 911, the message to be spoken to a user is generated and delivered. According to one embodiment, the text accessed in step 909 is converted to speech and delivered to a user. According to one particular embodiment, when the method of FIG. 9 is used in conjunction with the system described in FIGS. 1–8, the text accessed in step 909 is sent to text-to-speech engine 1814 and converted to speech that is delivered to a user through the established call channel.

According to one embodiment, the text is generated and delivered in a manner dictated by style properties selected for the user. According to an alternative embodiment, the manner in which the text is generated and delivered to a user may be selected or altered during the IVB by the user. For example, the user may have the option of choosing the language styles (e.g., the French/English, female/male) during the during the IVB. As another example the user may choose short or long forms of menus ("If you would like to hear more information press 9" vs. "More information, press 9") during the IVB.

In step 912, a determination is made whether or not user input is expected. According to one embodiment, this determination is made based on the command accessed in step 910. According to this embodiment, based on the TML document, the command determines what is to be done after delivering text to a user. For example, if the text to be delivered to a user was part of a Prompt element or an Option element, the voice service system expects a response from the user.

If user input is expected control passes to step 913 where user input is received. According to one embodiment, user input is received at using standard telephony technology to interpret a user's keypad presses. According to another embodiment, speech recognition software is used to receive and interpret a user's spoken response. According to a particular embodiment, user responses are received at call builder 1813 through telephone lines 183.

It is determined whether or not the user input is in the proper form in step 914. As mentioned above in conjunction with step 910, user input may comprise a single digit or may comprise multiple digits or other forms of input depending on the dialog from which it originated. According to one embodiment, in step 914, when it is determined whether or not a user input is in the proper form, the user input is checked against the criteria specified in the TML element that defined it. At the beginning of step 909, TML engine 1812 has the internal variables for the current call, the current position in the TML document, and the last user input (or the "person" or "device" argument if control is at the beginning of the call). Thus, the TML engine 1812 knows what input to expect from a user because that type of input is specified in the TML element that generated the text and the command. For example, the TML element <PROMPT type="fixed" length="3" filter="\n gt 50 and \n lt 150" next="main"/> accepts a three digit number (Type="fixed", Length="3") that falls in the range between 50 and 150. If a user entered a number that meets these criteria, this PROMPT element will be executed. Other command structures are possible.

If user input is not in the proper form, an error message is returned in step 915. According to one embodiment, step 915 comprises accessing a portion of the TML document that contains an error message to be delivered to the user. In particular, if it is determined that the user has entered an improper input form, a command "GetNextStep" along with the argument error is returned to XML parsing engine 1812. In response to this command, XML parsing engine accesses a portion of the TML document which contains a response notifying the user that they have entered an erroneous form of input. The user may then be prompted to enter the proper input.

If in step 914 it is determined that the user input has taken the proper form control is passed to a new dialog element. According to one embodiment, the "GetNextStep" with the argument "next" is used to transfer control to a different dialog element. This dialog element could be in the same TML document, or in a different TML document. If the TML element is in a different TML document, the full URL of the TML document is specified. Other command structures are possible.

When the next dialog element has been determined, control is passed to step 909 where the next text to be spoken to the user is accessed. Similar to that described above, according to one embodiment, the next text to be spoken to the user is accessed using a command "GetNextStep" with the argument that comprises the user response. Thus, the user response acts as a pointer, to a new portion of the TML document containing the next text to be spoken to the user.

TML elements that request user input (i.e., Prompts and Options) may also include "store" and "remove" attributes that update the response collection. According to one embodiment, a "store" attribute indicates that the user response should be added to the response collection and the "remove" attribute indicates that a particular variable will be removed if a certain response is received. Other attributes are possible. Thus, after it is confirmed that an input of the appropriate form has been received, any "store" "remove" or other attributes are executed and result in changes of the variables.

Returning to step 912, if it is determined that no user input is expected, control passes to step 908 where the logical call channel is terminated. According to one embodiment, the logical call channel is terminated by breaking the connection with the user.

In step 916, any user response returned during the course of the call is stored for processing. According to one particular embodiment, responses received during the call are processed as discussed in conjunction with FIGS. 1–8. According to another embodiment, user responses may be processed during the course of the call. According to this embodiment, after user input has been received in step 912 and verified in step 913, the user response is forwarded to the appropriate module for processing. According to one embodiment as described in conjunction with FIGS. 1–8, the user response may be used to generate a database query against database system 12. According to another embodiment as described in conjunction with FIGS. 1–8, the user response may be used to complete a real-time e-commerce transaction. According to these embodiments, when the transaction is completed, control is returned to step 909 and additional text to be spoken to a user is accessed.

The system and method described above may be used in conjunction with an overall voice service method and system described above. According to one embodiment of the present invention, a system is provided for automatic, interactive, real-time, voice transmission of OLAP output to one or more subscribers. For example, subscribers may be called by the system, and have content delivered audibly over the telephone or other voice-enabled terminal device. During the IVB, information may be exchanged between the system and a subscriber. The system conveys content to the subscriber and, the subscriber may respond by pressing one or more buttons on a telephone touch pad dial (or other input mechanism) to hear more information, to exercise options, or to provide other responses. This interaction shapes the structure of a basic exchange between the system and the subscriber. During or after the call is terminated, the subscriber's responses may be stored and processed (e.g., by other applications).

According to one embodiment of the present invention, a method for automatic, interactive, real-time, voice transmission of OLAP output to one or more subscribers is provided. FIG. 1*a* depicts a flow chart of a method for automatic, interactive, real-time, voice transmission of OLAP output according to one embodiment. The method begins in step 110 with the creation of a voice service (e.g., by a system administrator or user). A voice service is created using, for example, a voice service wizard which may comprise a series of interfaces. One embodiment of a method for creating a voice service is explained in more detail below in conjunction with FIG. 1*b*. One embodiment of a voice service wizard is explained below in conjunction with FIG. 3*b*.

After a voice service is created, users may subscribe or be subscribed to the voice service (step 120), for example, by using a subscription interface. According to one embodiment, users may subscribe to an existing voice service over the telephone or by web-based subscription. A user may also be subscribed programmatically. In other embodiments, a user may subscribe to a voice service via electronic mail. Not every voice service created in step 110 is available for subscription. More specifically, according to another embodiment, only a user with appropriate access, such as the creator of the service, is allowed to subscribe himself or others to a service. Such a security feature may be set when the voice service is created.

In step 130, a scheduling condition or other predetermined condition for the voice services is monitored to determine when they are to be executed. That is, when a voice service is created or subscribed to, the creator or user specifies when the voice service is to be executed. A user may schedule a voice service to execute according to the date, the time of day, the day of the week, etc. and thus, the scheduling condition will be a date, a time, or a day of the week, either one time or on a recurring basis. In the case of an alert service, discussed in more detail below, the scheduling condition will depend on satisfaction of one or more conditions. According to one embodiment, the condition(s) to be satisfied is an additional scheduling condition. According to another embodiment, to another embodiment, a service may be executed "on command" either through an administrator or programmatically through an API. Scheduling of voice services is discussed in more detail below.

The method continues monitoring the scheduling condition for voice services until a scheduling condition is met. When a scheduling condition is met, that voice service is executed. The execution of a voice service involves, inter alia, generating the content for the voice service, and structuring the voice service to be interactively broadcast through a call server. The execution of a voice service is explained in detail in conjunction with FIG. 1*c*.

An example of an IVB is as follows.
PERSONALIZED GREETING
Hello Joe, this is your stock update.
PIN VERIFICATION
Please enter your six digit PIN number
(Joe enters his PIN, using the keypad dial on his telephone.)
MENU OPTIONS
Your portfolio was up by $1000 today.
Please select:
1. To get a portfolio stock update
2. To conduct a transaction
(Joe presses 2)
SUB MENU
Thank you, Joe! Please select a ticker.
1. PQT
2. TQP
3. Listen to options again
4. Return to main menu
(Joe presses 1.)
SUB MENU
Would you like to buy or sell stock? Please press:
1. To sell stock
2. To buy stock
(Joe presses 1.)
SUB MENU
How many shares of PQT would you like to sell today? Please press:
1. To sell 50 shares
2. To sell 100 shares
3. To sell 200 shares
4. To sell another quantity
(Joe presses 2.)
SUB MENU
You selected 2. You want to sell 100 shares of PQT. Please press:
1. If this is correct
2. If this is incorrect
3. If you want to change the number of shares you want to buy.

(Joe presses 1.)
END VOICE SERVICE/TERMINATE IVB
Thank you for using our voice interactive broadcasting service, Joe. We will call you
back when your transaction is completed. Good-bye.

As can be seen from the above sample during an IVB, the user is presented with information, e.g., the status of his portfolio, and is presented options related to that report, e.g., the option to buy or sell stock.

According to one embodiment, a voice service is constructed using service wizard. A voice service is constructed using several basic building blocks, or elements, to organize the content and structure of a call. According to one embodiment, the building blocks of a voice service comprise elements of a markup language. According to one particular embodiment, elements of a novel markup language based on XML (TML) are used to construct voice services. Before explaining how an IVB is constructed, it will be helpful to define these elements.

The DIALOG element is used to define a unit of interaction between the user and the system and it typically contains one or more of the other elements. A DIALOG can not be contained in another element.

The SPEECH element is used to define text to be read to a user.

The INPUT element is used to define a section of a DIALOG that contains interactive elements, i.e., those elements that relate to a response expected from a user and its validation. An INPUT element may contain OPTION, PROMPT and ERROR elements.

An OPTION element identifies a predefined user selection that is associated with a particular input. According to one embodiment, OPTION elements are used to associate one or more choices available to a user with telephone keys.

A PROMPT element defines a particular input that is expected. According to one embodiment, a PROMPT element defines that a sequence or number of key presses from a telephone keypad is expected as input. Unlike an OPTION Element, a PROMPT Element is not associated with pre-defined user selections.

The PROMPT and OPTION elements may also be used to request user input using natural language. According to one embodiment, speech recognition technology is used to enable a user to respond to a PROMPT element or to select an OPTION element verbally by saying a number, e.g., "one.". The verbal response is recognized and used just as a keypress would be used. According to another embodiment, the user may provide a free form verbal input. For example, a PROMPT element may request that a user enter, e.g., the name of a business. In response the user speaks the name of a business. That spoken name is then resolved against predetermined standards to arrive at the input. Word spotting and slot filling may also be used in conjunction with such a PROMPT to determine the user input. For example, a PROMPT may request that the user speak a date and time, e.g., to choose an airline flight or to make a restaurant reservation. The user's spoken response may be resolved against known date and time formats to determine the input. According to another embodiment, a PROMPT is used to request input using natural language. For instance, in conjunction with a voice service to be used to make travel plans, instead of having separate PROMPT elements request input for flight arrival, departure dates and locations, a single natural language PROMPT may ask, "Please state your travel plan." In response, the user states 'I'd like to go from Washington D.C. to New York city on the $3^{rd}$ of January and return on the $3^{rd}$ of February.' This request would be processed using speech recognition and pattern matching technology to derive the user's input.

The ERROR element is used to define the behavior of the system if a user makes an invalid response such as touching a number that has not been associated with an OPTION element, or entering input that does not meet the criteria of a PROMPT element. A SYS-ERROR element defines a handler for certain events, such as expiration of the waiting time for a user response.

The FOR-EACH element is used to direct the system to loop through a list of variables e.g., variables contained in a database report, or variables from a user input, to dynamically generate speech from data.

In addition to the elements described above, there are two features that maximize an administrator's ability to design voice services. Call Flow Reports enable an administrator to generate the structure of a call based on the content of an report e.g., from an OLAP system or other data repository. For example, the options presented to a user in a PROMPT element may be made to correspond to the row of a data report. According to one embodiment, report data is converted into options by application of an XSL (extensible style sheet language) style sheet. The result of this application is inserted into the static call structure when the voice service is executed.

The use of an XSL style sheet is a feature that maximizes an administrator's voice service building ability. As discussed above, they are used to create dynamic call structure that depends on data report output. They may also be used to generate a text string that comprises the message to be read to a user at any point in a call.

A method for creating a voice service according to one embodiment will now be explained in conjunction with FIG. 2. The method begins in step 210 by naming the voice service. Then, in step 220 various scheduling parameters of the voice service are defined. In step 250 the service content is defined. And, in step 260, the personalization modes, or style properties are selected for the voice service.

According to one embodiment, in step 210, a voice service is named and a description of the voice service provided. By providing a name and description, a voice service may be uniquely identified. An interface is provided for prompting input of the name of the service to be created or edited. An input may also be provided for a written description. An open typing field would be one option for providing the description input. According to another embodiment, if an existing call service has been selected to edit, the service name field may not be present or may not allow modification.

In step 220, conditions for initiating the service are selected. This may include selecting and defining a service type. At least two types of services may be provided based on how the services are triggered. A first type of service is run according to a predetermined schedule and output is generated each time the service is run. A second type of service, an alert service, is one that is run periodically as well, however, output is only generated when certain criteria is satisfied. Other service types may be possible as well. In one embodiment the administrator is prompted to choose between a scheduled service or an alert service. An interface may provide an appropriate prompt and some means for selecting between a scheduled service and an alert service. One option for providing the input might be an interface with a two element toggle list.

In one embodiment, a set of alert conditions is specified to allow the system to evaluate when the service should be initiated if an alert type service has been selected. In one embodiment, a report or a template/filter combination upon which the alert is based is specified. Reports and template/filter combinations may be predefined by other objects in the system including an agent module or object creation module. According to one embodiment, an agent module, such as DSS agent™ offered by MicroStrategy, may be used to create and define reports with filters and template combinations, and to establish the alert criteria for an alert service. According to another embodiment, an interface is be provided which includes a listing of any alert conditions presently selected for the voice service. According to this embodiment, the interface may comprise a display window. A browse feature may take the user to a special browsing interface configured to select a report or filter-template combination. One embodiment of an interface for selecting reports and filter-template combinations is described below. Once a report or filter and template combination is chosen, the alerts contained in the report or filter and template combination may be listed in the display window of the interface.

In step 220, the schedule for the service is also selected. According to one embodiment, predefined schedules for voice services may be provided or a customized schedule for the voice service may be created. If a new schedule is to be created, a module may be opened to enable the schedule name and parameters to be set. Schedules may be run on a several-minute, hourly, daily, monthly, semi-annual, annual or other bases, depending upon what frequency is desired. According to one embodiment, an interface is provided that allows the administrator to browse through existing schedules and select an appropriate one. The interface may provide a browsing window for finding existing schedule files and a "new schedule" feature which initiates the schedule generating module. In one embodiment, schedules may not be set for alert type services. However, in some embodiments, a schedule for evaluating whether alert conditions have been met may be established in a similar manner.

In step 220, the duration of the service is also set. Service duration indicates the starting and stopping dates for the service. Setting a service duration may be appropriate regardless of whether a scheduled service or alert type service has been selected. The start date is the base line for the scheduled calculation, while the end date indicates when the voice service will no longer be sent. The service may start immediately or at some later time. According to one embodiment, interface is provided to allow the administrator to input start and end dates. The interface may also allow the administrator to indicate that the service should start immediately or run indefinitely. Various calendar features may be provided to facilitate selection of start and stop dates. For example, a calendar that specifies a date with pull-down menus that allow selection of a day, month and year may be provided according to known methods of selecting dates in such programs as electronic calendar programs and scheduling programs used in other software products. One specific aid that may be provided is to provide a calendar with a red circle indicating the present date and a blue ellipse around the current numerical date in each subsequent month to more easily allow the user to identify monthly intervals. Other methods may also be used.

In step 220, a voice service may also be designated as a mid-tier slicing service. In one embodiment, mid-tier slicing services generate content and a dynamic subscriber list in a single query to an OLAP system. According to one embodiment, in a mid-tier slicing service a single database query is performed for all subscribers to the service. The result set developed by that query is organized in a table that contains a column that indicates one or more users that each row of data is applicable to.

In step 250, the content of the voice service is defined. Defining the content of the voice service may include selecting the speech to be delivered during the voice service broadcast (content), the structure of dialogs, menus, inputs, and the background procedures which generate both content and structure. In one embodiment, defining voice service content establishes the procedures performed by the vss server to assemble one or more active voice pages in response to initiation of the voice service. According to one embodiment, defining service content involves establishing a hierarchical structure of TML elements which define the structure and content of a voice service. All of the elements in a given service may be contained within a container.

The personalization type is selected in step 260. Personalization type defines the options that the administrator will have in applying personalization filters to a voice service. According to one embodiment, a personalization filter is a set of style properties that can be used to determine what content generated by the service will be delivered to the individual user and in what format it will be delivered. In one embodiment, personalizing the delivery format may include selection of style properties that determine the sex of the voice, the speed of the voice, the number of call back attempts, etc. Personalization filters may exist for individual users, groups of users, or types of users. According to one embodiment, personalization filters may be created independent of the voice service. According to this embodiment, a voice service specifies what filters are used when generating IVBs. Some personalization type options may include: allowing no personalization filters; allowing personalization filters for some users, but not requiring them; and requiring personalization filters for all interactive voice broadcasts made using the service.

According to one embodiment, specifying personalization type is accomplished by administrator input through an interface. The interface may offer a toggle list with the three options: required personalization, optional personalization, and no personalization.

Figure 3A:
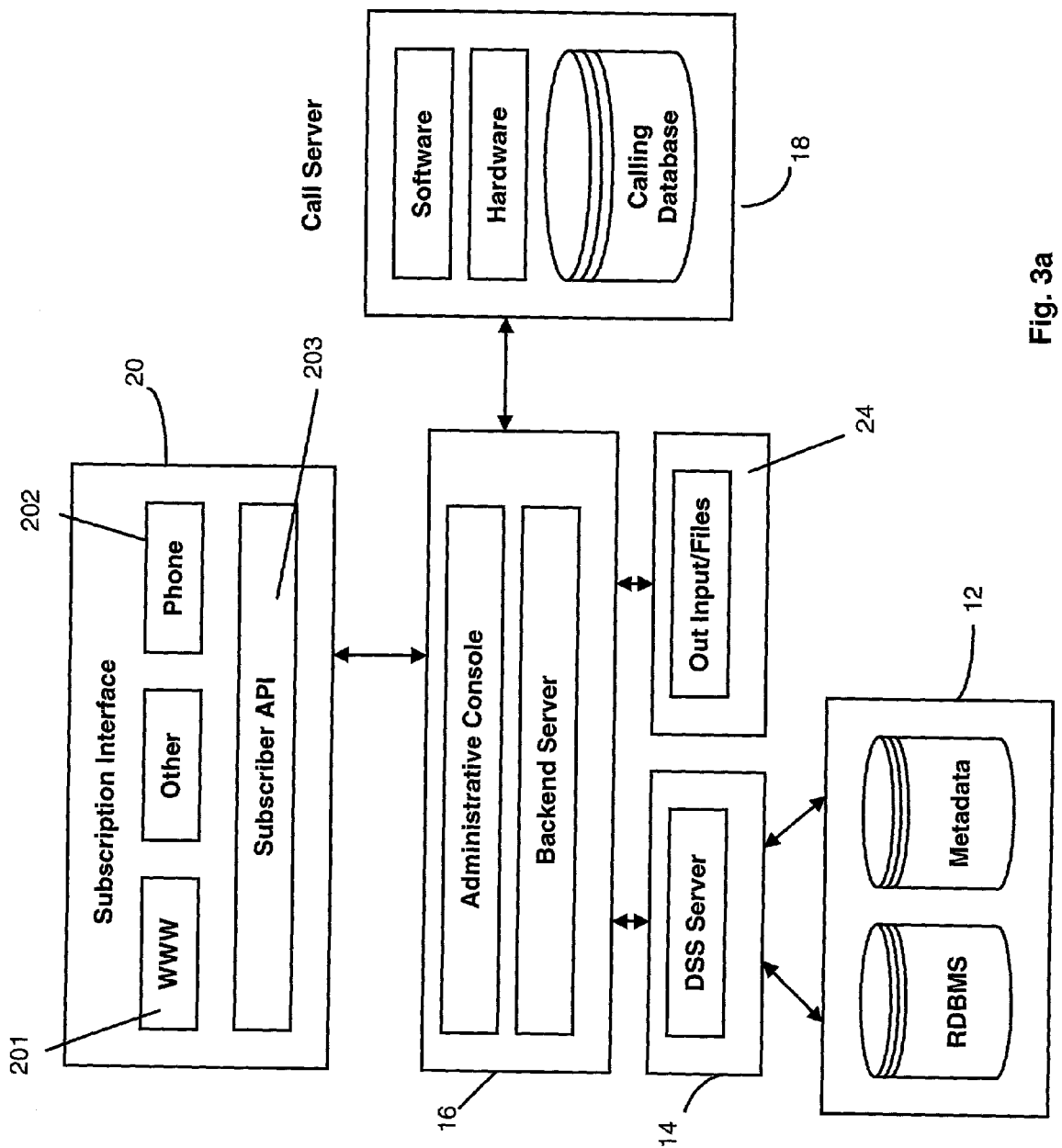
FIG. 3a is a schematic block diagram of a system in accordance with an embodiment of the present invention.
Figure 3B:
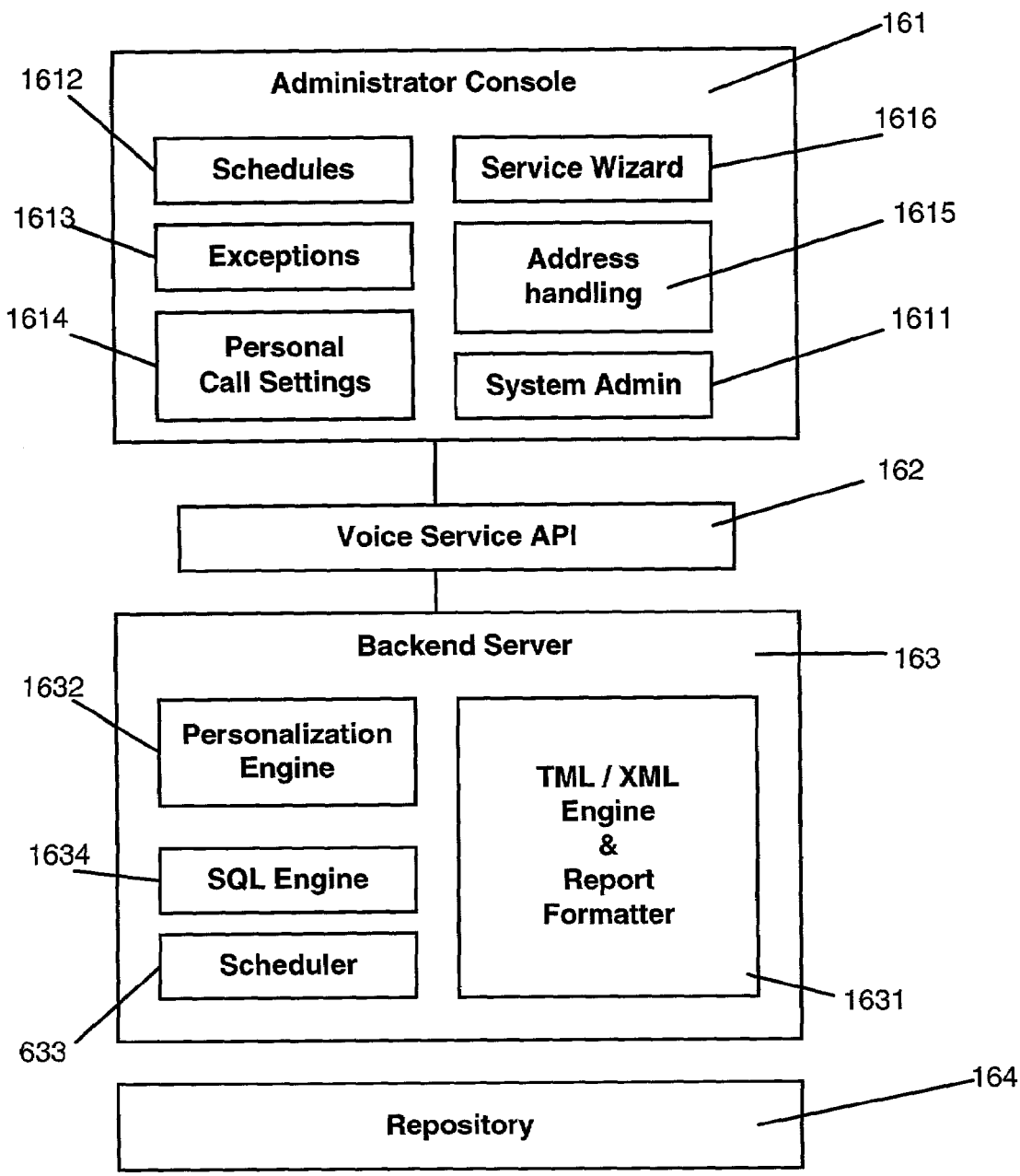
FIG. 3b is a schematic block diagram of an intelligence server according to an embodiment of the present invention.
Figure 3C:
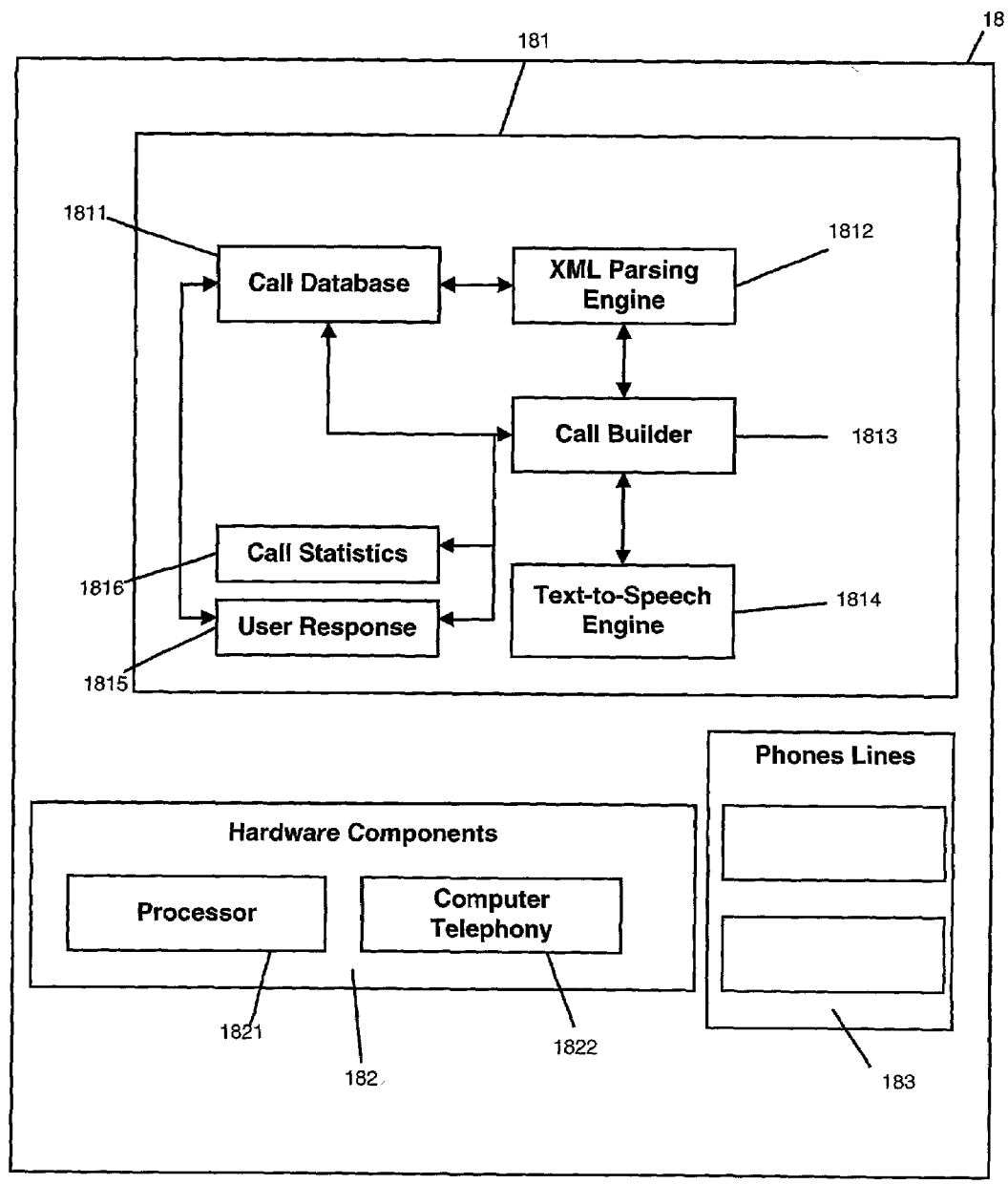
FIG. 3c is a schematic block diagram of call server according to an embodiment of the present invention.

The voice service may be stored in a database structure to enable users to retrieve predefined voice services and to subscribe to these services, for example, through subscription interfaces explained in conjunction FIGS. 3a–3c or otherwise. An interface informing the administrator that creation of the voice service is complete may also be provided.

According to one embodiment, the method of FIG. 1b also comprises an error condition step. An error condition step may be used to enable administrators to specify "error" conditions and the handling of those conditions. For example, an "error" condition may comprise a notification that a server is "down" or that there is no data to be returned. An administrator may specify particular actions to be performed by the system in response to one or more error conditions. For example, an administrator may specify an "addressing" error (e.g., disconnected number) and indicate a particular action to be performed in response to an "addressing" error (e.g., notify system administrator). Other error conditions might include: an alert report encountering an error and returning no data; a subscriber lacking the required personalization filter for the service; errors occurring in the generation of one or more reports; or reports returning no data. Various other conditions and actions may be specified. Certain error conditions may be predetermined for the system, but an administrator may have reasons for supplementing or diverging from the predetermined error conditions. According to one particular embodiment, error conditions are specified using the ERROR and SYS-ERROR elements.

In one embodiment, setting error conditions may be accomplished using an error handling interface. The interface may allow the administrator to select either default error handling, or to customize error handling using a module for defining error handling. If default handling is selected, the system uses established settings. If customized handling is chosen, the user may use a feature to access the appropriate interface for the error handling module.

Servers may have limited capacity to perform all of the actions required of them simultaneously, the method of FIG. 1b comprises a step for prioritizing the execution and delivery of voice services. Prioritization may establish the order in which the voice service system allocates resources for processing voice service and delivering the IVB. According to one embodiment, assigning priority to a voice service establishes priority for queries to the database system, formatting the voice service, or IVBs. Any criteria may be used for establishing priority. According to one embodiment, priority is established based on service content. According to another embodiment, priority is based on service destination. According to another embodiment, priority may be established based on the type of voice service, i.e., alert vs. scheduled. Any number of procedures or criteria for denoting relative importance of service delivery may be established.

In one embodiment, an interface is provided for defining the priority of the voice service being created or edited. According to one embodiment, the interface comprises a screen including option boxes with pull down menus listing the number of different prioritization options.

Figure 1C:
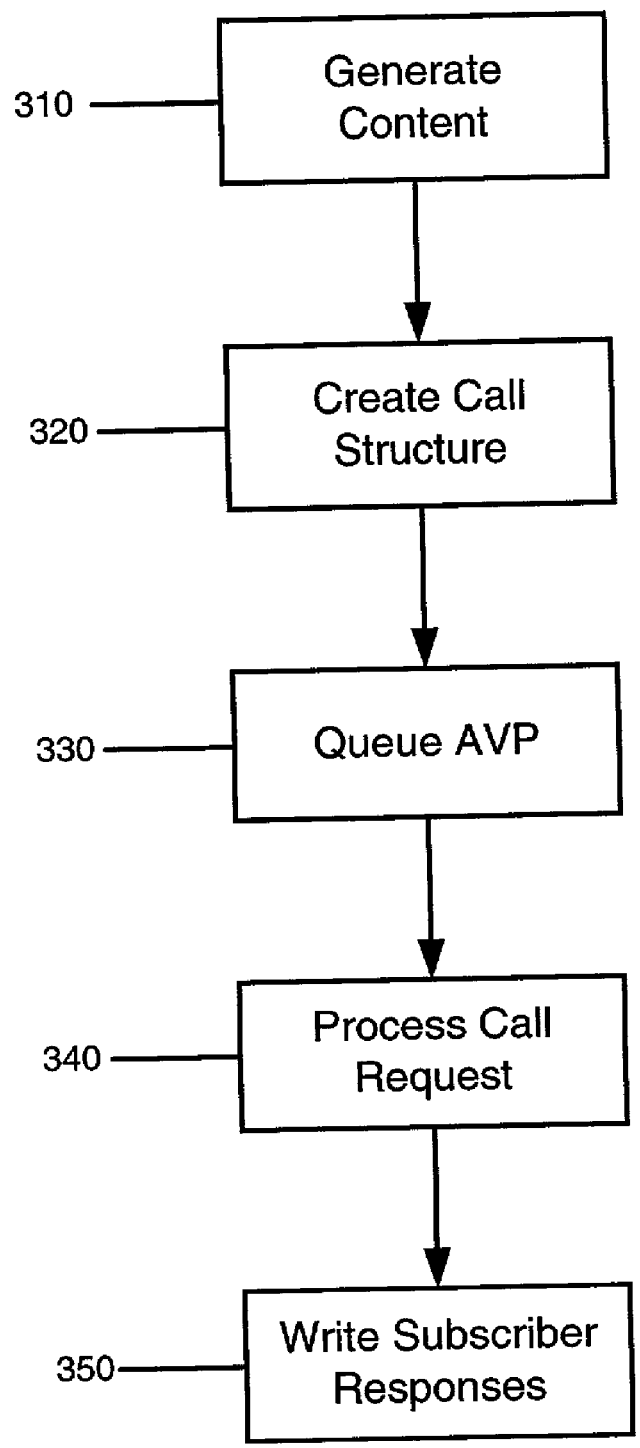
FIG. 1c is a flow chart indicating a method for interactive voice broadcasting according to an embodiment of the present invention.

Another aspect of the invention relates to a method for executing a voice service. FIG. 1c depicts one example of a flow chart for executing a voice service. In step 310, the content of a voice service is generated. In step 320, the call structure of an IVB is created via Active Voice Pages. In step 330, the AVPs are put in a call database for processing e.g., in a call queue. In step 340, the call request is processed and an interactive voice broadcast with the user is implemented. In step 350, user's responses are written back to the voice service system (e.g., the Active Voice Page). Each of these steps will be explained in more detail below.

According to one embodiment, content is created in step 310 as follows. A voice service execution begins by running scheduled reports, queries or by taking other action to determine whether the service should be sent. The subscribers for the service are then resolved. Datasets are generated for each group of subscribers that has unique personalization criteria.

Call structure may be created (step 320) as follows. An AVP contains data at various hierarchical content levels (nodes) that can be either static text or dynamic content. Static text can be generated e.g., by typing or by incorporating a text file. Dynamic content may be generated e.g., by inserting data from a data report using a grid an/or an XSL stylesheet. Moreover, content is not limited to text based information. Other media, such as, sound files, may be incorporated into the AVP. The call data (for example, at a particular level) may be the text that is converted to speech and played when the recipient encounters the node.

According to another embodiment, call content may include content from other voice pages, for example, "standard" active voice pages that are generated and inserted into a database or Web Server where the pages are periodically refreshed. According to one particular embodiment, the active voice page that is generated for a user contains links to other active voice pages. The links may be followed using a process similar to web page links.

The call structure may comprise either a static structure that is defined in the voice service interfaces e.g., by typing text into a text box and/or a dynamic structure generated by grid/XSL combinations. The dynamic structure is merged with static structure during the service execution. A single call structure is created for each group of users that have identical personalization properties across all projects because such a group will receive the same content.

After a call structure is generated, in step 330, it is sent to a call database e.g., call database 1811 shown in FIG. 3c along with the addresses and style properties of the users. The style properties govern the behavior of a call server 18 in various aspects of the dialog with a user. Call server 18 queries call database 1811 for current call requests and places new call requests in its queue.

In step 340, a call request is processed. A call is implemented on call server 18 using one of several ports that are configured to handle telephone communication. When a port becomes available, the call request is removed from the queue and the call is made to the user. As the user navigates through an active voice page, e.g., by entering input using the key pad or by speaking responses, call/content is presented by converting text to speech in text-to-speech engine 1814. User input during the call may be stored for processing. According to another embodiment, user responses and other input may also be used to follow links to other active voice pages. For example, as explained above, "standard" active voice pages may be generated and inserted into a database or Web Server. Then, when a user's voice service is delivered, that voice service may contain links to information that may be accessed by a user. A user may access those standard active voice pages by entering input in response to OPTION or PROMPT elements.

In step 350, user responses are stored by the system. According to one embodiment, user responses are stored in a response collection defined by the active voice page. A voice service may specify that a subscriber return information during an IVB so that another application may process the data. For instance, a user may be prompted to purchase a commodity and be asked to enter or speak the number of units for the transaction. During or after an IVB, the subscriber's responses are written to a location from which they can be retrieved for processing (e.g., by an external application).

Figure 2:
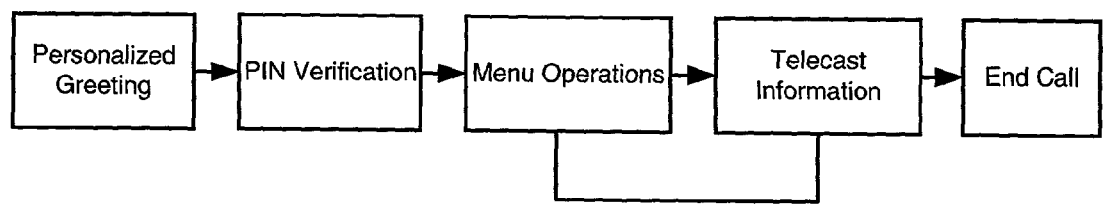
FIG. 2 is a flow chart indicating a sequence of an interactive voice broadcast according to one embodiment of the present invention.

FIG. 2 is an example of an IVB with interactive call flow. An IVB usually contains a greeting message that addresses the targeted user, identifies the name of the calling application, and states the purpose of the call and/or presents summary metrics. The voice service system can also implement a PIN verification protocol, if this layer of security is required. The main menu structure of an IVB can contain a number of options that lead to sub-menu structures. A menu can also contain prompts for the user to enter numerical information using a telephone touch pad dial. A node along the hierarchical menu structure may have options to return the user to a higher level.

FIG. 3 depicts an embodiment of a system according to one embodiment of the present invention. Preferably, the system comprises database system 12, a DSS server 14, voice service server 16, a call server 18, subscription interface 20, and other input/files 24.

Database system 12 and DSS server 14 comprise an OLAP system that generates user-specified reports from data maintained by database system 12. Database system 12 may comprise any data warehouse or data mart as is known in the art, including a relational database management system ("RDBMS"), a multidimensional database management system ("MDDBMS") or a hybrid system. DSS server 14 may comprise an OLAP server system for accessing and managing data stored in database system 12. DSS server 14 may comprise a ROLAP engine, MOLAP engine or a HOLAP engine according to different embodiments. Specifically, DSS server 14 may comprise a multithreaded server for performing analysis directly against database system 12. According to one embodiment, DSS server 14 comprises a ROLAP engine known as DSS Server™ offered by MicroStrategy.

Voice service server (VSS) 16, call server 18 and subscription interface 20 comprise a system through which subscribers request data and reports e.g., OLAP reports through a variety of ways and are verbally provided with their results through an IVB. During an IVB, subscribers receive their requested information and may make follow-up requests and receive responses in real-time as described above. Although the system is shown, and will be explained, as being comprised of separate components and modules, it should be understood that the components and modules may be combined or further separated. Various functions and features may be combined or separated.

Subscription interface 20 enables users or administrators of the system to monitor and update subscriptions to various services provided through VSS 16. Subscription interface 20 includes a world wide web (WWW) interface 201, a telephone interface 202, other interfaces as desired and a subscriber API 203. WWW interface 201 and telephone interface 202 enable system 100 to be accessed, for example, to subscribe to voice services or to modify existing voice services. Other interfaces may be used. Subscriber API 203 provides communication between subscription interface 20 and VSS 16 so that information entered through subscription interface 20 is passed through to VSS 16.

Subscription interface 20 is also used to create a subscriber list by adding one or more subscribers to a service. Users or system administrators having access to VSS 16 may add multiple types of subscribers to a service such as a subscriber from either a static recipient list (SRL) (e.g., addresses and groups) or a dynamic recipient list (DRL) (described in further detail below). The subscribers may be identified, for example, individually, in groups, or as dynamic subscribers in a DRL. Subscription interface 20 permits a user to specify particular criteria (e.g., filters, metrics, etc.) by accessing database system 12 and providing the user with a list of available filters, metrics, etc. The user may then select the criteria desired to be used for the service. Metadata may be used to increase the efficiency of the system.

A SRL is a list of manually entered names of subscribers of a particular service. The list may be entered using subscription interface 20 or administrator console 161. SRL entries may be personalized such that for any service, a personalization filter (other than a default filter) may be specified. A SRL enables different personalizations to apply for a login alias as well. For example, a login alias may be created using personalization engine 1632. Personalization engine 1632 enables subscribers to set preferred formats, arrangements, etc. for receiving content. The login alias may be used to determine a subscriber's preferences and generate service content according to the subscriber's preferences when generating service content for a particular subscriber.

A DRL may be a report which returns lists of valid user names based on predetermined criteria that are applied to the contents of a database such as database system 12. Providing a DRL as a report enables the DRL to incorporate any filtering criteria desired, thereby allowing a list of subscribers to be derived by an application of a filter to the data in database system 12. In this manner, subscribers of a service may be altered simply by changing the filter criteria so that different user names are returned for the DRL. Similarly, subscription lists may be changed by manipulating the filter without requiring interaction with administrator console 161. Additionally, categorization of each subscriber may be performed in numerous ways. For example, subscribers may be grouped via agent filters. In one specific embodiment, a DRL is created using DSS Agent™ offered by MicroStrategy.

VSS 16 is shown in more detail in FIG. 3b. According to one embodiment, VSS 16 comprises administrator console 161, voice service API 162 and backend server 163. Administrator console 161 is the main interface of system 100 and is used to view and organize objects used for voice broadcasting. Administrator console 161 provides access to a hierarchy of additional interfaces through which a system administrator can utilize and maintain system 100. Administrator console 161 comprises system administrator module 1611, scheduling module 1612, exceptions module 1613, call settings module 1614, address handling module 1615, and service wizard 1616.

System administrator module 1611 comprises a number of interfaces that enable selection and control of the parameters of system 100. For example, system administrator module 1611 enables an administrator to specify and/or modify an email system, supporting servers and a repository server with which system 100 is to be used. System administrator 1611 also enables overall control of system 100. For example, system administrator module is also used to control the installation process and to start, stop or idle system 100. According to one embodiment, system administrator 1611 comprises one or more graphical user interfaces (GUIs).

Scheduling module 1612 comprises a number of interfaces that enable scheduling of voice services. Voice services may be scheduled according to any suitable methodology, such as according to scheduled times or when a predetermined condition is met. For example, the predetermined condition may be a scheduled event (time-based) including, day, date and/or time, or if certain conditions are met. In any event, when a predetermined condition is met for a given service, system 100 automatically initiates a call to the subscribers of that service. According to one embodiment, scheduling module 1612 comprises one or more GUIs.

Exceptions module 1613 comprises one or more interfaces that enable the system administrator to define one or more exceptions, triggers or other conditions. According to one embodiment, exceptions module 1613 comprises one or more GUIs.

Call settings module 1614 comprises one or more interfaces that enable the system administrator to select a set of style properties for a particular user or group of users. Each particular user may have different options for delivery of voice services depending on the hardware over which their voice services are to be delivered and depending on their own preferences. As an example of how the delivery of voice services depends on a user's hardware, the system may deliver voice services differently depending on whether the user's terminal device has voice mail or not. As an example of how the delivery of voice services depends on a user's preferences, a user may chose to have the pitch of the voice, the speed of the voice or the sex of the voice varied depending on their personal preferences. According to one embodiment, call settings module 1614 comprises one or more GUIs.

Address handling module 1615 comprises one or more interface that enable a system administrator to control the address (e.g., the telephone number) where voice services content is to be delivered. The may be set by the system administrator using address handling module 1615. According to one embodiment, address handling module 1615 comprises one or more GUIs.

Voice service wizard module 1616 comprises a collection of interfaces that enable a system administrator to create and/or modify voice services. According to one embodiment, service wizard module 1616 comprises a collection of interfaces that enable a system administrator to define a series of dialogs that contain messages and inputs and determine the call flow between these dialogs based on selections made by the user. The arrangement of the messages and prompts and the flow between them comprises the structure of a voice service. The substance of the messages and prompts is the content of a voice service. The structure and content are defined using service wizard module 1616.

Voice service API 162 (e.g., MicroStrategy Telecaster Server API) provides communication between administrator console 161 and backend server 163. Voice Service API 162 thus enables information entered through administrator console 161 to be accessed by backend server 163 (e.g., MicroStrategy Telecaster Server).

Backend server 163 utilizes the information input through administrator console 161 to initiate and construct voice services for delivery to a user. Backend server 163 comprises report formatter 1631, personalization engine 1632, scheduler 1633 and SQL engine 1634. According to one embodiment, backend server 163 comprises MicroStrategy Broadcast Server. Report formatter 1631, personalization engine 1632, and scheduler 1633 operate together, utilizing the parameters entered through administrator console 161, to initiate and assemble voice services for transmission through call server 18. Specifically, scheduler 1633 monitors the voice service schedules and initiates voice services at the appropriate time. Personalization engine 1632 and report formatter 1631 use information entered through service wizard 1616, exceptions module 1613, call settings module 1614, and address module 1615, and output provided by DSS server 14 to assemble and address personalized reports that can be sent to call server 18 for transmission. According to one embodiment, report formatter 1631 includes an XML based markup language engine to assemble the voice services. In a particular embodiment, report formatter includes a Telecaster Markup Language engine offered by MicroStrategy Inc. to assemble the call content and structure for call server 18.

SQL engine 1634 is used to make queries against a database when generating reports. More specifically, SQL engine 1634 converts requests for information into SQL statements to query a database.

Repository 164 may be a group of relational tables stored in a database. Repository 164 stores objects which are needed by system 100 to function correctly. More than one repository can exist, but preferably the system 100 is connected to only one repository at a time.

According to one embodiment, a call server 18 is used to accomplish transmission of the voice services over standard telephone lines. Call server 18 is shown in more detail in FIG. 3c. According to one embodiment, call server 18 comprises software components 181 and hardware components 182. Software components 181 comprise call database 1811, mark-up language parsing engine 1812, call builder 1813, text-to-speech engine 1814, response storage device 1815 and statistic accumulator 1816.

Call database 1811 comprises storage for voice services that have been assembled in VSS 16 and are awaiting transmission by call server 18. These voice services may include those awaiting an initial attempt at transmission and those that were unsuccessfully transmitted (e.g., because of a busy signal) and are awaiting re-transmission. According to one embodiment, call database 1811 comprises any type of relational database having the size sufficient to store an outgoing voice service queue depending on the application. Call database 1811 also comprises storage space for a log of calls that have been completed.

Voice services stored in call database 1811 are preferably stored in a mark-up language. Mark-up language parsing engine 1812 accepts these stored voice services and separates the voice services into parts. That is, the mark-up language version of these voice services comprises call content elements, call structure elements and mark-up language instructions. Mark-up language parsing engine 1812 extracts the content and structure from the mark-up language and passes them to call builder 1813.

Call builder 1813 is the module that initiates and conducts the telephone call to a user. More specifically, call builder dials and establishes a connection with a user and passes user input through to markup language parsing engine 1812. In one embodiment, call builder 1813 comprises "Call Builder" software available from Call Technologies Inc. Call builder 1813 may be used for device detection, line monitoring for user input, call session management, potentially transfer of call to another line, termination of a call, and other functions.

Text-to-speech engine 1814 works in conjunction with mark-up language parsing engine 1812 and call builder 1813 to provide verbal communication with a user. Specifically, after call builder 1813 establishes a connection with a user, text-to-speech engine 1814 dynamically converts the content from mark-up language parsing engine 1812 to speech in real time.

A voice recognition module may be used to provide voice recognition functionality for call server 181. Voice recognition functionality may be used to identify the user at the beginning of a call to help ensure that voice services are not presented to an unauthorized user or to identify if a human or machine answers the call. This module may be a part of call builder 1813. This module may also be used to recognize spoken input (say "one" instead of press "1"), enhanced command execution (user could say "transfer money from my checking to savings"), enhanced filtering (instead of typing stock symbols, a user would say "MSTR"), enhanced prompting, (saying numeral values).

User response module 1815 comprises a module that stores user responses and passes them back to intelligence server 16. Preferably, this is done within an AVP. During a telephone call, a user may be prompted to make choices in response to prompts by the system. Depending on the nature of the call, these responses may comprise, for example, instructions to buy or sell stock, to replenish inventory, or to buy or rebook an airline flight. User response module 1815 comprises a database to store these responses along with an identification of the call in which they were given. The identification of the call in which they were given is important to determining what should be done with these responses after the call is terminated. User responses may be passed back to intelligence server 16 after the call is complete. The responses may be processed during or after the call, by the system or by being passed to another application.

Statistics accumulator 1816 comprises a module that accumulates statistics regarding calls placed by call builder 1813. These statistics including, for example, the number of times a particular call has been attempted, the number of times a particular call has resulted in voice mail, the number of times a user responds to a call and other statistics, can be used to modify future call attempts to a particular user or the structure of a voice service provided to a particular user. For example, according to one embodiment, statistics accumulator 1816 accumulates the number of times a call has been unsuccessfully attempted by call builder 1813. This type of information is then used by call server 18 to determine whether or not the call should be attempted again, and whether or not a voice mail should be left.

Call server 18 also comprises certain hardware components 182. As shown in FIG. 1c, hardware components 182 comprise processor 1821 and computer telephone module 1822. According to one embodiment, processor 1821 comprises a Pentium II processor, available from Intel, Inc. Module 1822 provides voice synthesis functionality that is used in conjunction with Text to Speech engine 1814 to communicate the content of voice services to a user. Module 1822 preferably comprises voice boards available from Dialogic, Inc. Other processors and voice synthesizers meeting system requirements may be used.

The system and method of the present invention may form an integral part of an overall commercial transaction processing system.

According to one embodiment of the present invention, a system and method that enable closed-loop transaction processing are provided. The method begins with the deployment of an IVB by executing a service. As detailed above, this includes generating the content and combining this with personalization information to create an active voice page. Call server 18 places a call to the user. During the call, information is delivered to the user through a voice-enabled terminal device (e.g., a telephone or cellular phone).

During the IVB, a user may request a transaction, service, further information from the database or other request, e.g., based on options presented to the user. These will generically be referred to as transactions. The request may be, but is not necessarily, based on or related to information that was delivered to the user. According to one embodiment, the request comprises a user response to a set of options and/or input of information through a telephone keypad, voice input or other input mechanism. According to another embodiment, the request can be made by a user by speaking the request. Other types of requests are possible.

According to one embodiment, the user responses are written to a response collection, which along with information stored in the active voice page, can be used to cause a selected transaction to be executed. According to one embodiment, the active voice page comprises an XML-based document that includes embedded, generic requests, e.g., a request for a transaction, or a request for additional information (a database query). These embedded requests are linked with, for example option statements or prompts so that when a user enters information, the information is entered into the generic request and thus completes a specific transaction request. For example, in the example if a user exercises an option to buy a particular stock, that stock's ticker symbol is used to complete a generic "stock buy" that was embedded in the active voice page.

According to one embodiment, tokens are used to manage user inputs during the IVB. A token is a temporary variable that can hold different values during an IVB. When a user enters input, it is stored as a token. The token value is used to complete a transaction request as described above. According to one embodiment, the system maintains a running list of tokens, or a response collection, during an IVB.

In order to complete the requested transaction, the user responses (and other information from the active voice page) may need to be converted to a particular format. The format will depend, for example, on the nature and type of transaction requested and the system or application that will execute the transaction. For example, a request to purchase goods through a web-site may require the information to be in HTML/HTTP format. A request for additional information may require and SQL statement. A telephone-based transaction may require another format.

Therefore, the transaction request is formatted. According to one embodiment, the transaction is formatted to be made against a web-based transaction system. According to another embodiment, the transaction request is formatted to be made against a database. According to another embodiment, the transaction is formatted to be made against a telephone-based transaction system. According to another embodiment, the transaction is formatted to be made via e-mail or EDI. Other embodiments are possible.

In one embodiment, the formatted transaction request comprises an embedded transaction request. The system described in connection with FIGS. 1–3 provides interactive voice services using TML, a markup language based on XML. Using TML active voice pages are constructed that contain the structure and content for a interactive voice broadcast including, inter alia, presenting the user with options and prompting the user for information. Moreover in connection with OPTION and PROMPT elements, active voice pages also can include embedded statements such as transaction requests. Therefore, the formatting for the transaction request can be accomplished ahead of time based on the particular types of transactions the user may select.

For example, in connection with an exemplary stock purchase, an active voice page can include an embedded transaction request to sell stock in the format necessary for a particular preferred brokerage. The embedded statement would include predefined variables for the name of the stock, the number of shares, the type of order (market or limit, etc.), and other variables. When the user chooses to exercise the option to buy or sell stock, the predefined variables are replaced with information entered by the user in response to OPTION or PROMPT elements. Thus, a properly formatted transaction request is completed.

In the system of FIGS. 1–3, TML parsing engine in call server 18 includes the functionality necessary to generate the properly formatted transaction request as described above. For example, in connection with the embodiment described above, the TML parsing engine shown in FIG. 3c reads the active voice pages. When the TML parsing engine reads an OPTION element that includes and embedded transaction request, it stores the transaction request, and defines the necessary variables and variable locations. When the user exercises that OPTION, the user's input is received by the TML parsing engine and placed at the memory locations to complete the transaction request. This technique could be used, for example, to generate a formatted transaction request for web-site.

According to another embodiment, where the transaction request is made via a natural language, voice request, a formatted transaction request can be generated in a number of ways. According to one embodiment, speech recognition technology is used to translate the user's request into text and parse out the response information. The text is then used to complete an embedded transaction request as described above. According to another embodiment, speech recognition software is used to translate the request to text. The text is then converted to a formatted request based on a set of known preferences.

A connection is established with the transaction processing system. This can be accomplished during, or after the IVB. According to one embodiment, the transaction processing system comprises a remotely located telephone-based transaction site. For example, in the system shown in FIGS. 1–3, call server 18, through the TML parsing engine 1812, establishes a connection with a telephone-based transaction processing site.

According to another embodiment, the transaction processing system comprises a remotely based web-site. According to this embodiment, the formatted request includes a URL to locate the web-site and the system accesses the site through a web connection using the formatted request. Alternatively, the formatted request includes an e-mail address and the system uses any known email program to generate an e-mail request for the transaction.

After the connection is established, the transaction is processed by the transaction processing site and the user is notified of the status of the transaction. If the transaction is completed in real-time, the user may be immediately notified. If the transaction is executed after the IVB, the user may be called again by the system, sent an e-mail, or otherwise notified when the transaction has been completed.

According to one particular embodiment, the system comprises the interactive voice broadcasting system shown and described in FIGS. 1–3 and the transaction is accomplished in real-time. In this embodiment, confirmation of the transaction is returned to TML parsing engine 1812 shown in FIG. 3 and translated to speech in text-to-speech engine 1814 and presented to the user during the IVB. More specifically, and similar to the process described with respect to embedded formatted transaction requests, TML also enables embedding of a response statement. Thus, when the transaction is processed and confirmation of the transaction is returned to the system, an embedded confirmation statement is conveyed to the user through TML parsing engine 1812 after being converted to speech in text-to-speech engine 1814.

Figure 4:
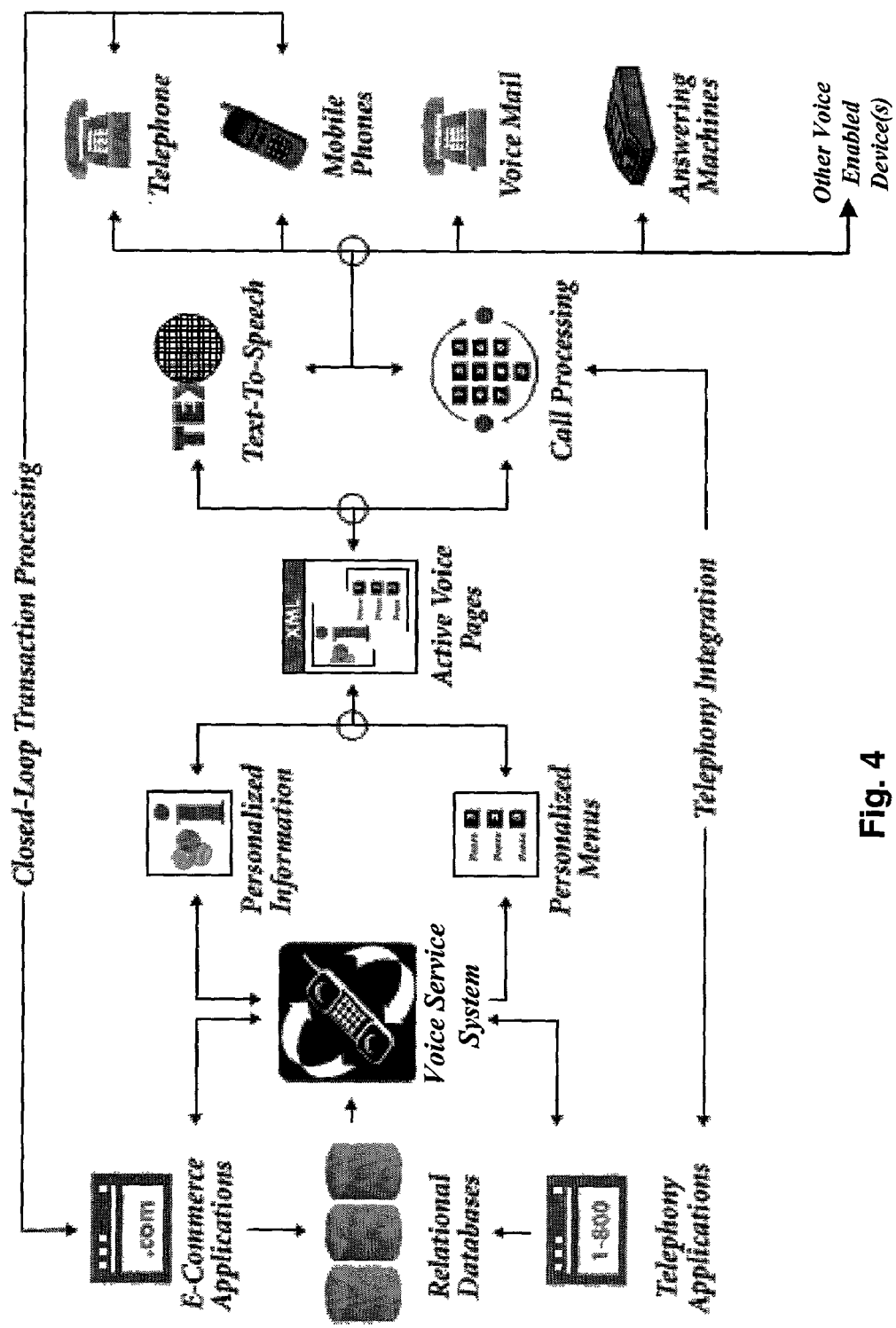
FIG. 4 is a schematic block diagram of a commercial transaction processing system according to an embodiment of the present invention.

FIG. 4 schematically depicts one example of how the system and method of the present invention would fit into such a commercial transaction processing system. Working from left to right in FIG. 4, the system begins and ends with information stored in relational databases. One of the primary purposes of information is in making decisions. Thus, the information in the databases is most useful if provided to someone who desires it in a timely fashion.

A voice service system is provided to enable access to the information in the databases. The voice service system utilizes personalization information and personalized menus to construct AVPs pages that enable the information to be delivered to a user verbally. Moreover, the AVPs pages, not only enable information to be presented to the user. But, they also enable the user to provide information back to the voice service system for additional processing.

According to the embodiment shown in FIG. 4, once the AVPs are constructed by voice service system, they are processed and the content is delivered to a user verbally in an IVB. Thus, call processing and text-to-speech technology are used to establish a telephone connection with a user and convert the active voice pages to speech for presentation to the user. As shown in FIG. 4, the IVB may be delivered to a user in many devices, including a telephone, a mobile phone, voice mail, an answering machine or any other voice-enabled device.

During the IVB, depending on the content that is being delivered, control may be passed to an e-commerce application for the user to complete a transaction based on the information presented. For example, if the user has requested information about sales on a particular brand of merchandise, the user may be connected with a particular retailer in order to complete a transaction to buy a particular good or service. Information about this transaction is then added to the databases and thus may be advantageously accessed by other users.

It may not be economical for some potential users of a voice broadcasting system to buy and/or maintain their own telephony hardware and software as embodied in call server 18. In such a case, a voice service bureau may be maintained at a remote location to service users voice service requests. A voice service bureau and a method of using a voice service bureau according to various embodiments of the present invention is described in conjunction with FIGS. 5–6.

In one embodiment, a voice service bureau may comprise one or more call servers and call databases that are centrally located and enable other voice service systems to generate a call request and pass the call request to the VSB to execute a call. In this way the other voice service systems do not need to invest in acquiring and maintaining call data bases, call servers, additional telephone lines and other equipment or software. Moreover, the VSB facilitates weeding out usage of illegal numbers and spamming by number checking implemented through its web server.

Figure 5:
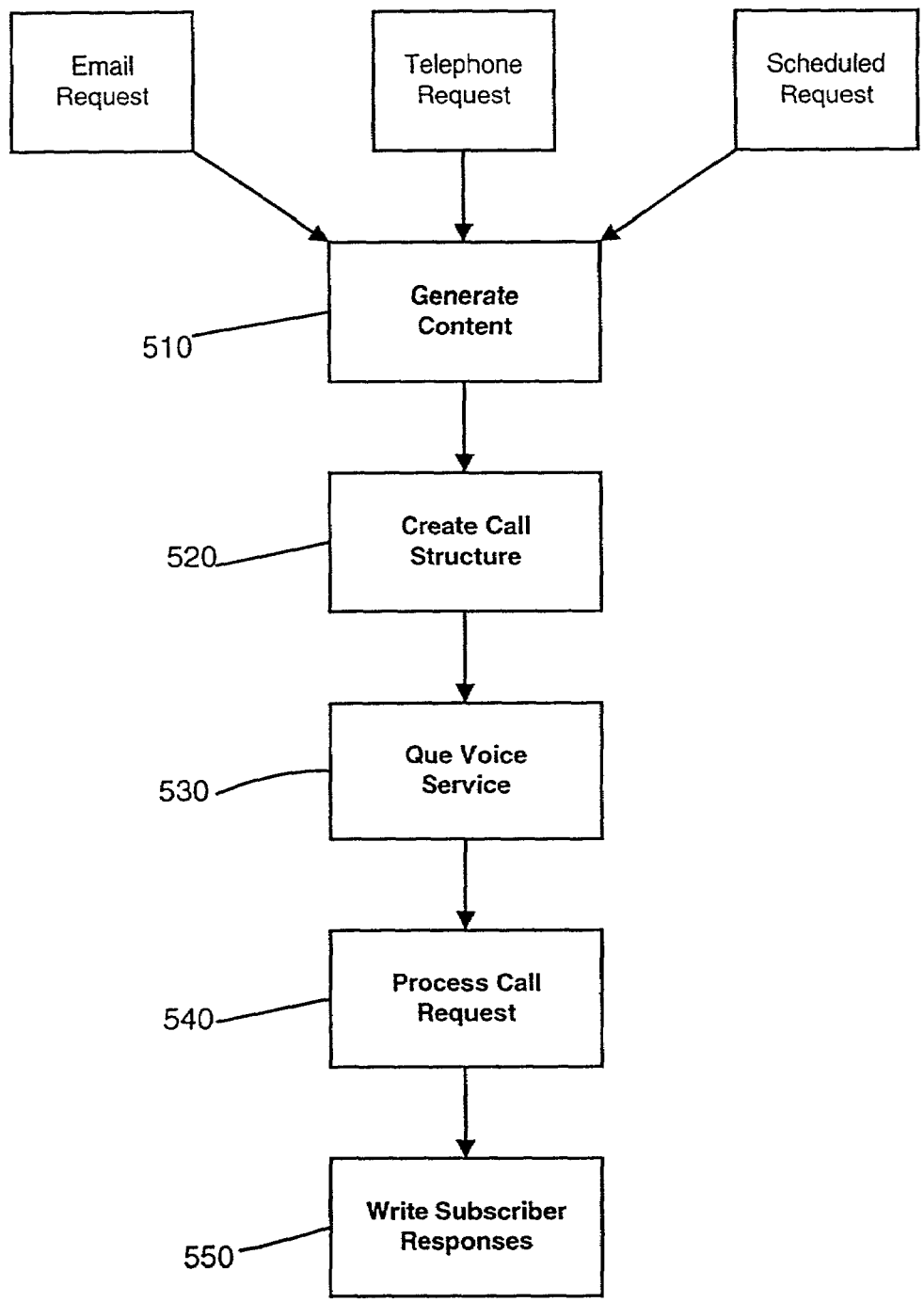
FIG. 5 is a flow chart of a method of using a voice service bureau according to an embodiment of the present invention.

A voice service bureau and a method of using a voice service bureau according to one embodiment are described in conjunction with FIGS. 5–6. FIG. 5 depicts a method of utilizing a voice service bureau according to one embodiment of the present invention. The method begins in step 810 with a request to place one or more telephone calls received through a computer network.

According to one embodiment, the voice service bureau is maintained at a location distant from the voice service system. Therefore, in order for a voice service to be processed by the voice service bureau, in step 810 the voice service is sent to the voice services bureau, preferably over some secure line of communication. According to one embodiment, the request is sent to the voice service bureau through the Internet using secure HTTPS. HTTPS provides a secure exchange of data between clients and the voice service bureau using asymmetric encryption keys based on secure server certificates. In another embodiment, SSL HTTP protocol is used to send a call request to the voice service bureau. Both of these protocols help ensure that a secure channel of communication is maintained between the voice service system and the voice service bureau. Other security techniques may be used.

When a request for a call or IVB is received, by the VSB, the request is authenticated by the voice service bureau in step 820. According to one embodiment, the authenticity of the request is determined in at least two ways. First, it is determined whether or not the request was submitted from a server having a valid, active server certificate. More specifically, requests may be typically received via a stream of HTTPS data. Each such request originating from a server with a valid server certificate will include an embedded code (i.e., server certificate) that indicates the request is authentic. In addition to the use of server certificates, each request may also be authenticated using an identification number and password. Therefore, if the request submitted does not include a valid server certificate and does not identify a valid I.D./password combination, the request will not be processed. The step of authenticating also comprises performing any necessary decryption. According to one embodiment, any errors that are encountered in the process of decrypting or authenticating the call request are logged an error system and may be sent back to the administrator of the sending system. Other methods of authenticating the request are possible.

Each properly authenticated request is sent to a call server (step 830) and processed (step 840). According to one embodiment, the voice service bureau comprises a number of call servers. According to one embodiment, the calls are sent to a call database, and processed as set forth herein in conjunction with the explanation of call server 18.

Figure 6A:
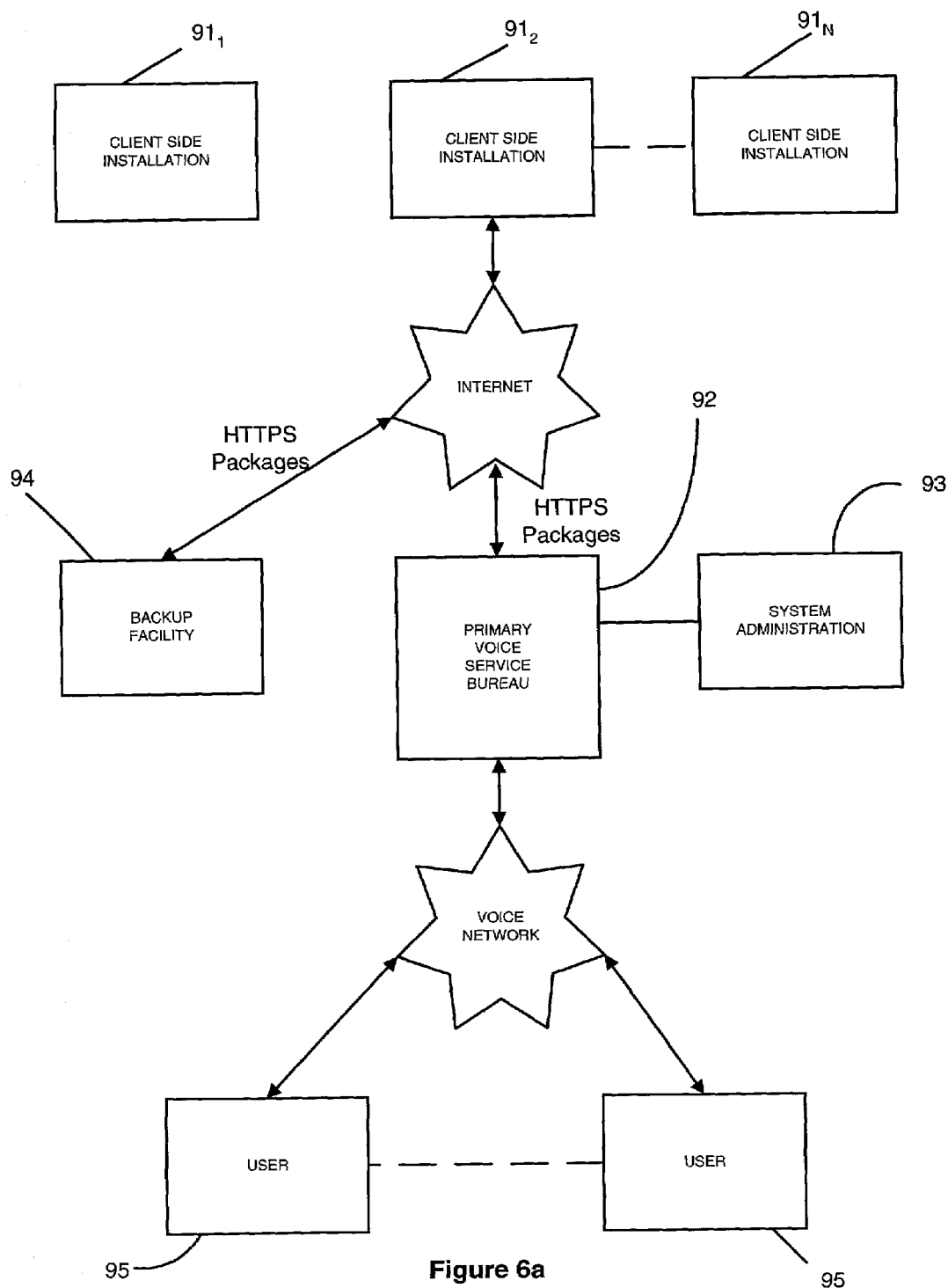
FIG. 6a is a schematic block diagram of a voice service system incorporating a voice service bureau according to one embodiment of the present invention.

One embodiment of a voice service bureau will now be explained in conjunction with FIGS. 6a–6c. FIG. 6a depicts a system comprising a plurality of client side installations 91, a primary voice bureau 92, a system administrator 93, a backup voice service bureau 94, and a plurality of users 95. Client side installations 91 communicate with voice service bureau 92 through a computer network. Voice service bureau 92 communicates with users 95 through a voice network. According to one embodiment, the computer network comprises the internet and client side installations 91 communicate with voice service bureau 92 using HTTPS as described above, and the voice network comprises a public telephone network.

According to one embodiment, client side installations 91 are substantially identical to the system shown in FIG. 4 except for the elimination of call server 18. In the system of FIG. 6a, the functionality of call server 18 is performed by VSB 92. As shown in this embodiment, VSB 92 can service multiple client side installations 91₁ to 91n. According to another embodiment, client-side installation functionality may be included within VSB 92. According to this embodiment VSB 92 constitutes a fully functional voice service that is accessible through email, telephone or other interfaces.

According to this embodiment, when voice services have been assembled by intelligence server 16, a request to have the voice services transmitted is sent via a secure network connection through the computer network shown to primary voice bureau 92 and backup voice service bureau 94 as described above. According to one embodiment, the request comprises a mark-up language string that contains the voice service structure and content and personal style properties and other information. As described above, voice bureau 92 authenticates the request, queues the voice services and sends IVBs to users 95 through the voice network.

Figure 6B:
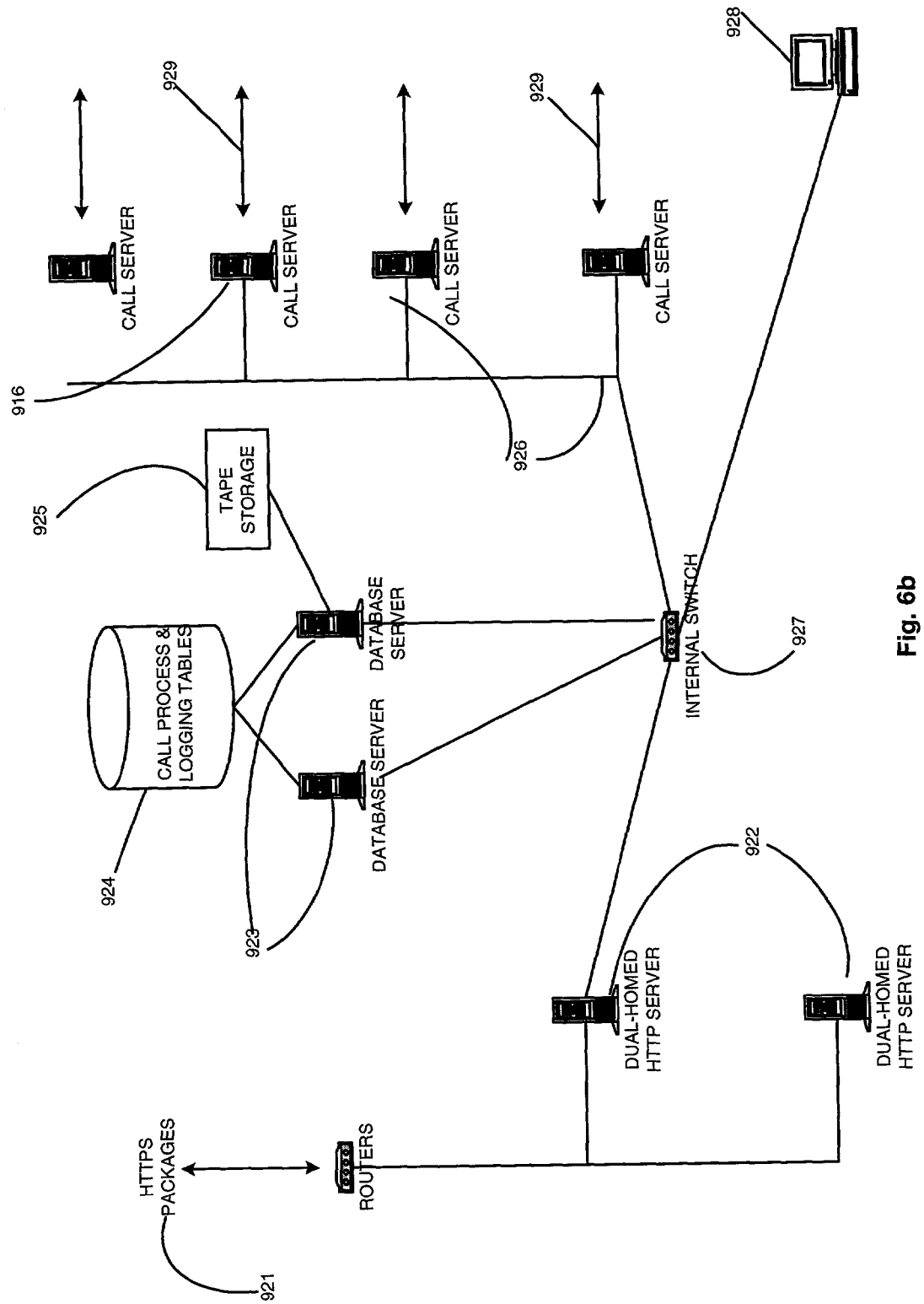
FIG. 6b is block diagram of a primary voice bureau according to one embodiment of the present invention.
Figure 6C:
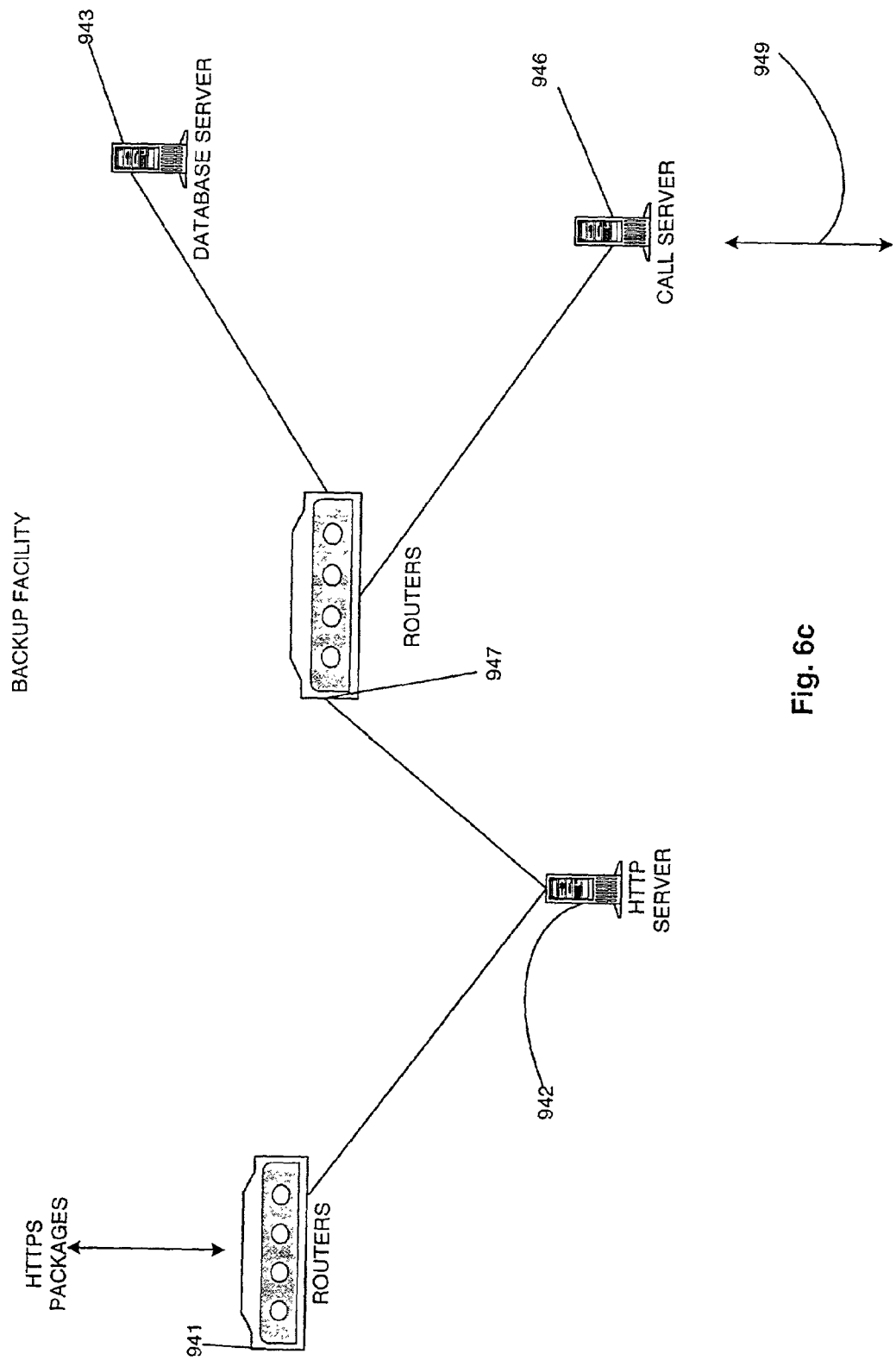
FIG. 6c is a block diagram of a backup voice bureau according to another embodiment of the present invention.

A block diagram of one embodiment of primary voice bureau 92 is shown in FIG. 6b. According to this embodiment, primary voice bureau comprises routers 921, dual-homed servers 922, database servers 923, call database 924, backup storage 925, call servers 926, internal switch 927, and system administrator 928. Routers 921 receive call requests via a computer network and pass them along to one of the two dual-homed servers 922. Router 921 monitors activity on servers 922 and forwards call requests to one of the two depending on availability.

Dual-homed servers 922 comprise servers configured to receive and send HTTPS email. As part of their receiving function, dual-homed servers 922 are configured to perform the authentication processing described above. According to one embodiment, dual-homed servers 922 determine whether the incoming request originated from a server with an active server certificate and also determine if the request contains a valid I.D./password combination. Once dual-homed servers 922 have authenticated the incoming request, they forward the request to be queued in call database 924. As part of their sending function, dual-homed servers 922 are configured to format and send HTTPS email. As discussed above, during an IVB a user may request that further information be accessed from a database or that some transaction be performed. According to one embodiment, these user requests are forwarded back to the originating system via HTTPS email by dual-homed servers 922. Dual-homed servers 922 are load balanced to facilitate optimal performance and handling of incoming call requests.

Database servers 923, call database 924, and backup storage 925 together comprise a call request queuing system. Primary voice bureau 92 is configured to handle a large number of call requests. It may not be possible to process call requests as they arrive. Therefore, call requests are queued in call database 924. According to one embodiment, call database 924 comprises a relational database that maintains a queue of all call requests that need to be processed as well as logs of calls that have been processed. According to another embodiment, primary VSB 92 may include a failover measure that enables another system server to become the call database if call database 924 should fail.

Database servers 923 are configured to control access to call database 924. According to one embodiment, database servers may be optimized to generate SQL statements to access entries in call database at high speed. Database servers 923 also control storage of call requests and call logs in call database 924.

Call servers 926 each are configured to format and send IVBs. According to one embodiment, each of call servers 926 is substantially identical to call server 18 shown in FIG. 3c. More specifically, each of call servers 926 receives requests for IVBs, parses the call content from the mark-language, establishes a connection with the user through phone lines 929, and receives user responses. According to one embodiment, call servers 926 comprise a clustered architecture that facilitates message recovery in the event of server failure.

Primary voice bureau 92 is controlled by system administrator 93 and internal switch 927. System administrator controls switch 927 and thus controls the flow of call requests to call database 924 from dual homed servers 922 and to call servers 926 from call database 924.

System administrator 93 is also configured to perform a number of other services for primary voice bureau 92. According to one embodiment, system administrator 93 also comprises a billing module, a statistics module, a service module and a security module. The billing modules tabulates the number of voice service requests that come from a particular user and considers the billing plan that the customer uses so that the user may be appropriately billed for the use of voice bureau 92. The statistics module determines and maintains statistics about the number of call requests that are processed by voice bureau 92 and statistics regarding call completion such as, e.g., success, failed due to busy signal and failed due to invalid number. These statistics may be used, for example, to evaluate hardware requirements and modify pricing schemes. The security module monitors activity on voice bureau 92 to determine whether or not any unauthorized user has accessed or attempted to access the system. The service module provides an interface through which primary voice bureau 92 may be monitored, for example, to determine the status of call requests. Other service modules are possible. Moreover, although these services are described as distinct modules, their functionality could be combined and provided in a single module.

Backup voice service bureau 94 receives a redundant request for voice services. Backup voice service bureau 94 processes the requests only when primary voice service bureau is offline or busy. One embodiment of backup voice service bureau 94 is shown in FIG. 6c. Backup voice bureau 94 comprises routers 941, HTTP server 942, database server 943, call server 946 and routers 947. Each of these components performs a function identical to the corresponding element in primary voice bureau 92. Router 947 replaces switch 927. Router 947 controls the forwarding of call requests to database server 943 for queuing in an internal database, and the forwarding of call requests to call server 946 from database server 943.

The systems and methods discussed above are directed to outbound broadcasting of voice services. Nevertheless, in certain situations, for example when the out bound IVB is missed, it is desirable to for a voice service system to enable inbound calling. According to another embodiment, a method and system for providing integrated inbound and outbound voice services is disclosed.

Figure 7:
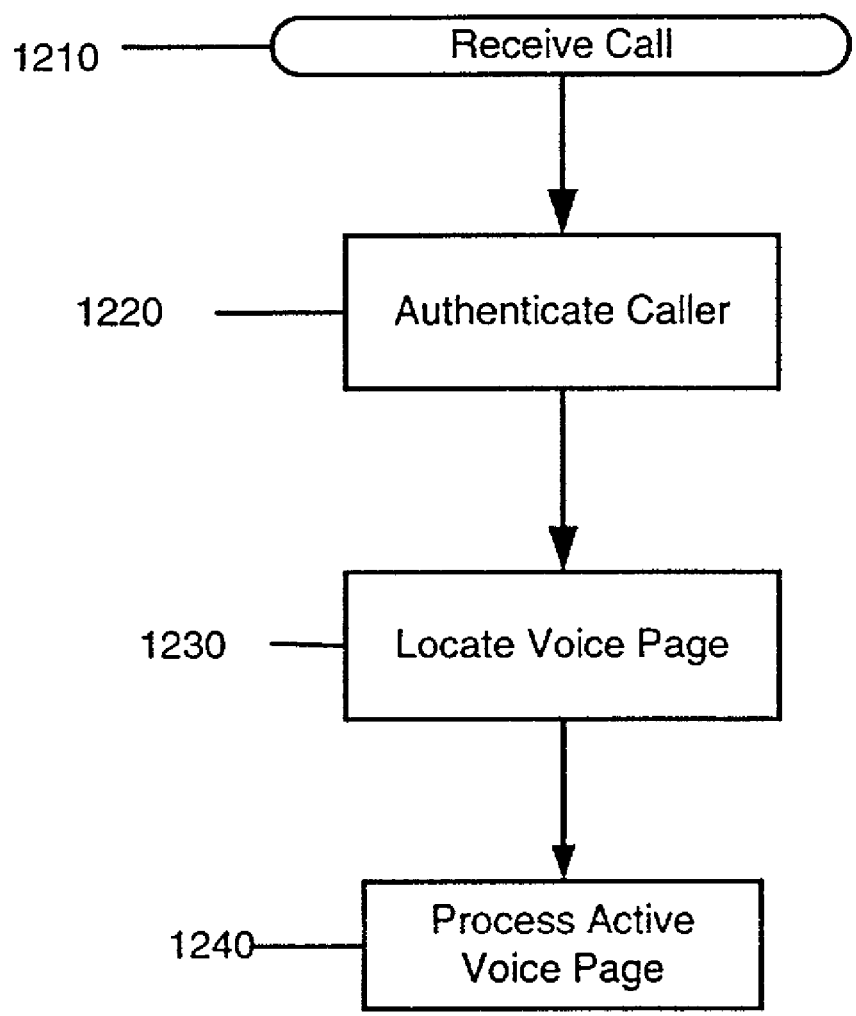
FIG. 7 is a flow chart illustrating a method for integrating inbound and outbound voice services.

A method for providing inbound access to voice services according to one embodiment of the present invention is shown in FIG. 7. According to FIG. 7, the method begins with receipt of a call requesting voice services in step 1210. To help ensure system integrity and to prevent unauthorized access, a call request is authenticated in step 1220. According to one embodiment, each incoming caller is automatically prompted to enter a login identifier and a PIN. According to another embodiment, an automatic number identification system is used, in addition to a login identifier and PIN system, to determine whether or not the user is calling from an authorized device. According to another embodiment, speaker recognition technology is utilized to identify a caller. According to this embodiment, voice prints for each user of the voice service system are stored as identifiers. When an inbound call is connected, pattern matching techniques are used verify the user's speech against the previously stored voice prints. Other security measures are possible.

In step 1230, a voice page is located. As explained above, an IVB of a voice service is driven by an active voice page. Accordingly, a user calling in to access voice services locates the desired active voice page. According to one embodiment, the user is automatically placed into an active voice page of a voice service that the user missed. That is, the system chooses an active voice page that it was unable to deliver. According to this embodiment, when a call is undeliverable (e.g., when an answering machine picks up), the active voice page for that call is placed in memory in a "voice site" table or as an active voice page on a web site and addressed using the user's identification. When the user calls in to retrieve the voice service, after the user logs in, the table or web site will be searched for an active voice page that corresponds to their identification. If such a page exists, it is executed by the call server.

Other possibilities exist for accessing active voice pages through inbound calling. According to another embodiment, the system maintains a log of all voice services sent and provides an inbound user an option to select one of their previous voice services. According to another embodiment, an inbound caller is automatically placed into an active voice page that presents the user with an option to select one of that user's most frequently used services. According to still another embodiment, the user is allowed to search for past active voice pages by date or content. For example, the user may be prompted to enter a date on or near which the desired voice page was executed. According to another embodiment, the user may use the telephone keys to enter a search term and search the content of any previously executed active voice page that they are authorized to access or that is not secure.

Once an active voice page is located, the user navigates through the active voice page in step 1240. As described above, a user navigates through an active voice by exercising options, responding to prompts and otherwise entering input to the system. An inbound calling system would thus have access to the full functionality of the voice service system described in conjunction with FIGS. 1–6.

FIG. 8 depicts a block diagram of a call server 18a that enables integrated inbound and outbound calling. In addition to the modules depicted in call server 18 of FIG. 3, call server 18a comprises call receiver module 1817, security module 1818 and search module 1819. Moreover, in the system for permitting inbound and outbound calling, call database 1811 has been replaced with an enhanced call database 1811a.

In order to receive inbound calls, call server 18a comprises call receiver module 1817. Although, call server 18 discussed above contains hardware permitting reception of calls as well as transmission of calls, it is not set up to receive calls. Call receiver module 1817 enables call server 18a to receive calls and routes the incoming calls to security module 1818. According to one embodiment, call receiver module comprises a software component designed to configure call server 18a to receive calls. Other embodiments are possible.

Received calls are forwarded to security module 1818 for authentication. According to one embodiment discussed above, incoming calls are authenticated using login I.D.'s and passwords. According to another embodiment, automatic number identification software is used to identify and authenticate callers. According to another embodiment, speech recognition and pattern matching techniques are used to identify a caller.

Authenticated calls may search for an active voice page using search module 1819. According to one embodiment, search module 1819 comprises a search engine designed specifically to search active voice pages. According to one embodiment discussed above, active voice pages utilize an XML-based language and search module 1819 comprises an XML-based search engine. According to another embodiment, search module 1819 comprises a SQL engine designed to make queries against a relational or other type of database.

The active voice pages that are being search are stored in enhanced call database 1811a. In addition to its facilities to queue and log calls, enhanced call database 1811 includes facilities to catalog active voice pages. According to one embodiment, enhanced call database comprises a relational or other type of database. According to this embodiment, enhanced call database is used to store and categorize active voice pages and corresponding parameters, such as expiration dates for active voice pages. Other storage facilities are possible.

Various features and functions of the present invention extend the capabilities of previously known information delivery systems. One such system is MicroStrategy's Broadcaster version 5.6. The features and functions of the present invention are usable in conjunction with Broadcaster and other information delivery systems or alone. Other products may be used with the various features and functions of the invention including, but not limited to, MicroStrategy's known product suite, including Microstrategy 7 and 7.1.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A method for establishing permission to initiate personalized interactive voice sessions of a voice service over a voice network to a user comprising:
    presenting a user with a list of available telephone-based marketing that may be transmitted to a user;
    querying the user for user permission information regarding the telephone-based marketing;
    receiving user permission information from the user indicating that user's permission for telephone-based marketing;
    generating one or more interactive voice pages related to product and service offerings;
    transmitting one or more of the generated interactive voice pages to that user based on the user's permissions.

2. The method of claim 1 wherein user permission information comprises information regarding when the telephone-based marketing may be sent.

3. The method of claim 1 wherein user permission information comprises information regarding how the telephone-based marketing may be sent.

4. The method of claim 1 wherein user permission information comprises information regarding where the telephone-based marketing may be sent.

5. The method of claim 1 wherein user permission information comprises the type of telephone-based marketing that may be sent.

6. A system for receiving permission to transmit an interactive voice broadcast of a voice service over a voice network comprising:
    a permission module for receiving user permission information from a user indicating that user's permission for telephone-based marketing;
    a call server for generating one or more interactive voice pages related to product and service offerings, and for transmitting the one or more voice pages to the user based on the user's permission.

7. The system of claim 6 wherein user permission information comprises when the telephone-based marketing may be sent.

8. The system of claim 6 wherein user permission information comprises how the telephone-based marketing may be sent.

9. The system of claim 6 wherein user permission information comprises where the telephone-based marketing may be sent.

10. The system of claim 6 wherein user permission information comprises the type of telephone-based marketing that may be sent.

11. A system for receiving permission to transmit an interactive voice broadcast of a voice service over a voice network comprising:
    presenting means for presenting a user with a list of available telephone-based marketing;
    query means for querying the user for user permission information regarding the telephone-based marketing;
    means for receiving user permission information from the user indicating that user's permission for telephone-based marketing;
    means for generating one or more interactive voice pages related to product and service offerings, and for transmitting the one or more voice pages to the user based on the user's permission.

12. The system of claim 11 wherein the means for receiving permission comprises a permission module.

13. The system of claim 11 wherein the means for generating one or more interactive voice ages comprises a call server.

14. The system of claim 11 further comprising means for accessing text for the user from at least one markup language document.

15. The system of claim 14 wherein the at least one markup language document is a TML document.

16. The system of claim 14 wherein the means for accessing text comprises a parsing engine.

17. The system of claim 14 further comprising means for generating personalized speech from the text for delivery to the user.

18. The system of claim 17 wherein the means for generating personalized speech comprises a text to speech engine.

19. The system of claim 11 wherein the voice network comprises the Public Switched Telephone Network.

20. The system of claim 11 wherein the user permission information comprises any one of the following: when the telephone-based marketing may be sent, how the telephone marketing may be sent, where the telephone-based marketing may be sent, and the type of telephone-based marketing that may be sent.

* * * * *